US009810529B2

(12) United States Patent
Shimaoka et al.

(10) Patent No.: US 9,810,529 B2
(45) Date of Patent: Nov. 7, 2017

(54) MEASURING PROBE FOR MEASURING A THREE-DIMENSIONAL SHAPE OF AN OBJECT TO BE MEASURED

(71) Applicant: MITUTOYO CORPORATION, Kanagawa (JP)

(72) Inventors: Atsushi Shimaoka, Kanagawa (JP); Tomoyuki Miyazaki, Kanagawa (JP); Kazuhiko Hidaka, Kanagawa (JP)

(73) Assignee: MITOTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/789,266

(22) Filed: Jul. 1, 2015

(65) Prior Publication Data
US 2016/0258744 A1    Sep. 8, 2016

(30) Foreign Application Priority Data

Mar. 5, 2015  (JP) .................. 2015-043035

(51) Int. Cl.
*G01B 11/24* (2006.01)
*G01B 11/00* (2006.01)
(Continued)

(52) U.S. Cl.
CPC ........ *G01B 11/2441* (2013.01); *G01B 5/0016* (2013.01); *G01B 5/012* (2013.01); *G01B 11/007* (2013.01); *G01B 11/14* (2013.01)

(58) Field of Classification Search
CPC ........ G01B 3/008; G01B 5/20; G01B 5/0016; G01B 5/012; G01B 11/007; G01B 7/012; G01B 5/016
(Continued)

(56) References Cited

U.S. PATENT DOCUMENTS 5,040,306 A    8/1991  McMurtry et al.
5,209,131 A    5/1993  Baxter
(Continued)

FOREIGN PATENT DOCUMENTS

CN    1721812 A    1/2006
CN    102305613 A    1/2012
(Continued)

OTHER PUBLICATIONS

Office Action in Japanese Patent Application No. 2015-043034 with partial English translation, dated Jul. 19, 2016.
(Continued)

*Primary Examiner* — Michael P Lapage
(74) *Attorney, Agent, or Firm* — Greenblum & Bernstein, P.L.C.

(57) ABSTRACT

A measuring probe includes a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by means of rotary motion. The measuring probe includes a main body housing that supports the axial motion mechanism, a module housing that supports the rotary motion mechanism, and a displacement detector supported by the main body housing for detecting displacement of the moving member. The measuring probe with this configuration ensures high measurement accuracy while keeping a low cost.

13 Claims, 20 Drawing Sheets

(51) Int. Cl.
  *G01B 11/14* (2006.01)
  *G01B 5/00* (2006.01)
  *G01B 5/012* (2006.01)

(58) Field of Classification Search
  USPC .................................................... 33/503
  See application file for complete search history.

(56) References Cited

U.S. PATENT DOCUMENTS

| | | | |
|---|---|---|---|
| 5,345,689 A * | 9/1994 | McMurtry | G01B 3/008 33/556 |
| 5,918,378 A | 7/1999 | McMurtry et al. | |
| 6,430,833 B1 | 8/2002 | Butter et al. | |
| 6,971,183 B2 | 12/2005 | Brenner et al. | |
| 7,055,258 B2 | 6/2006 | Hajdukiewicz et al. | |
| 7,146,741 B2 | 12/2006 | Butter et al. | |
| 7,281,433 B2 | 10/2007 | Jordil et al. | |
| 8,006,398 B2 | 8/2011 | McFarland et al. | |
| 8,578,619 B2 | 11/2013 | Nakajima | |
| 8,701,301 B2 | 4/2014 | Nakayama et al. | |
| 8,978,261 B2 | 3/2015 | McFarland et al. | |
| 9,057,599 B2 | 6/2015 | Mariller et al. | |
| 2002/0174556 A1 | 11/2002 | Butter et al. | |
| 2003/0048969 A1* | 3/2003 | Hunter | F16C 17/08 384/610 |
| 2005/0055839 A1 | 3/2005 | Brenner et al. | |
| 2005/0150125 A1 | 7/2005 | Hajdukiewicz et al. | |
| 2006/0005633 A1 | 1/2006 | Jordil et al. | |
| 2007/0056177 A1 | 3/2007 | Enderle et al. | |
| 2009/0025463 A1 | 1/2009 | McFarland et al. | |
| 2011/0094117 A1 | 4/2011 | Groell | |
| 2011/0283553 A1* | 11/2011 | McFarland | G01B 21/045 33/503 |
| 2012/0204435 A1* | 8/2012 | Nakajima | G01B 5/008 33/503 |
| 2012/0297906 A1 | 11/2012 | Groell | |
| 2013/0019488 A1* | 1/2013 | McMurtry | G01B 5/012 33/503 |
| 2013/0047452 A1 | 2/2013 | McMurtry et al. | |
| 2013/0212890 A1 | 8/2013 | Vullioud et al. | |
| 2013/0212891 A1 | 8/2013 | Mariller et al. | |
| 2013/0304250 A1 | 11/2013 | McMurtry et al. | |
| 2014/0011444 A1 | 1/2014 | Groell | |
| 2014/0053423 A1 | 2/2014 | Brenner | |
| 2015/0075020 A1 | 3/2015 | Mori et al. | |
| 2016/0258733 A1 | 9/2016 | Shimaoka | |
| 2016/0258738 A1 | 9/2016 | Shimaoka | |
| 2016/0258744 A1 | 9/2016 | Shimaoka | |

FOREIGN PATENT DOCUMENTS

| | | |
|---|---|---|
| CN | 102636144 A | 8/2012 |
| DE | 3701730 | 8/1988 |
| DE | 4308823 | 9/1994 |
| JP | S58-088604 | 5/1983 |
| JP | H04-369401 | 12/1992 |
| JP | H05-309551 | 11/1993 |
| JP | H05-312504 | 11/1993 |
| JP | H07-198370 | 8/1995 |
| JP | 2002-541444 | 12/2002 |
| JP | 2005-522655 | 7/2005 |
| JP | 2006-343249 | 12/2006 |
| JP | 4417114 | 2/2010 |
| JP | 2013-171039 | 9/2013 |

OTHER PUBLICATIONS

Extended European Search Report in European Patent Application No. 15175249.0-1568, dated Aug. 3, 2016.
Decision to Grant a patent issued in Japan Patent Appl. No. 2015-043034 with English translation, dated Nov. 15, 2016.
Office Action in the Japanese Patent Application No. 2015-043036 with partial English translation, dated Jul. 19, 2016.
Extended European search report in the European Patent Application No. 15175250.8-1568, dated Aug. 3, 2016.
Decision to Grant a patent issued in Japan Patent Appl. No. 2015-043036 with English translation, dated Oct. 18, 2016.
U.S. Appl. No. 14/789,211 to Atsushi Shimaoka et al., filed Jul. 1, 2015.
U.S. Appl. No. 14/789,283 to Atsushi Shimaoka et al., filed Jul. 1, 2015.
Office Action in the Japanese Patent Application No. 2015-043035 with partial English translation, dated Jul. 19, 2016.
Extended European search report in the European Application No. 15175249.0-1568, dated Aug. 3, 2016.
Decision to Grant a patent issued in Japan Patent Appl. No. 2015-043035 with English translation, dated Nov. 15, 2016.
Chinese Office Action issued in the Chinese Application No. 201510382742.X dated Mar. 29, 2017 along with an English language translation thereof.
Chinese Office Action issued in the Chinese Application No. 201510382391.2 dated Feb. 27, 2017 along with an English language translation thereof.

* cited by examiner

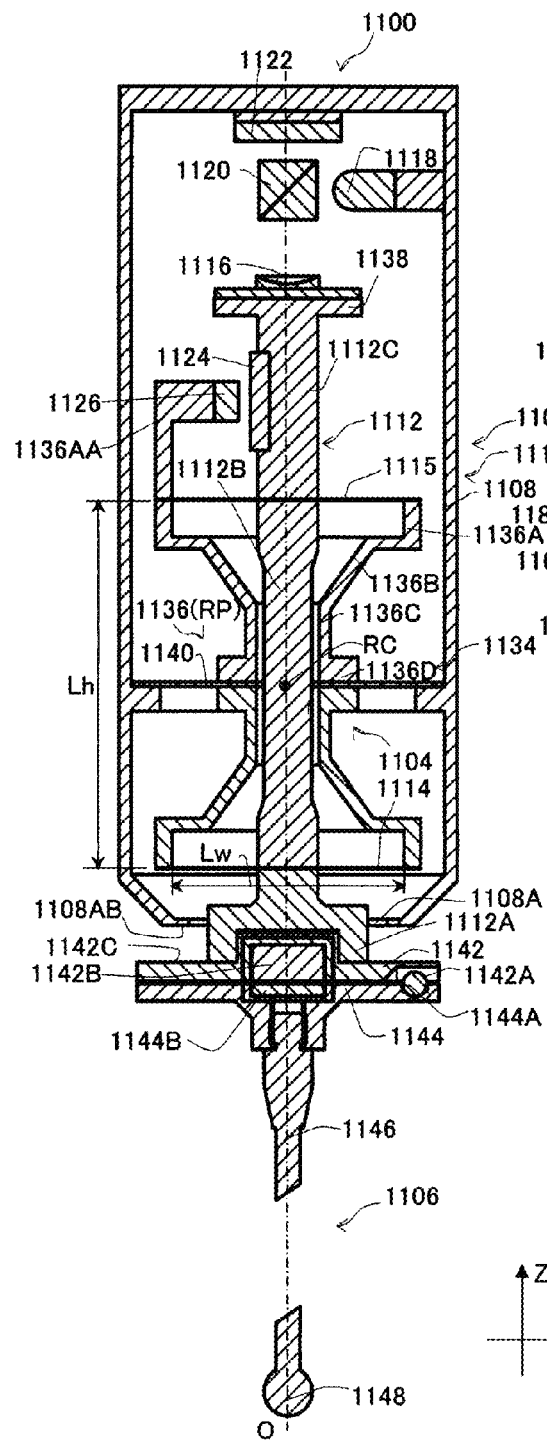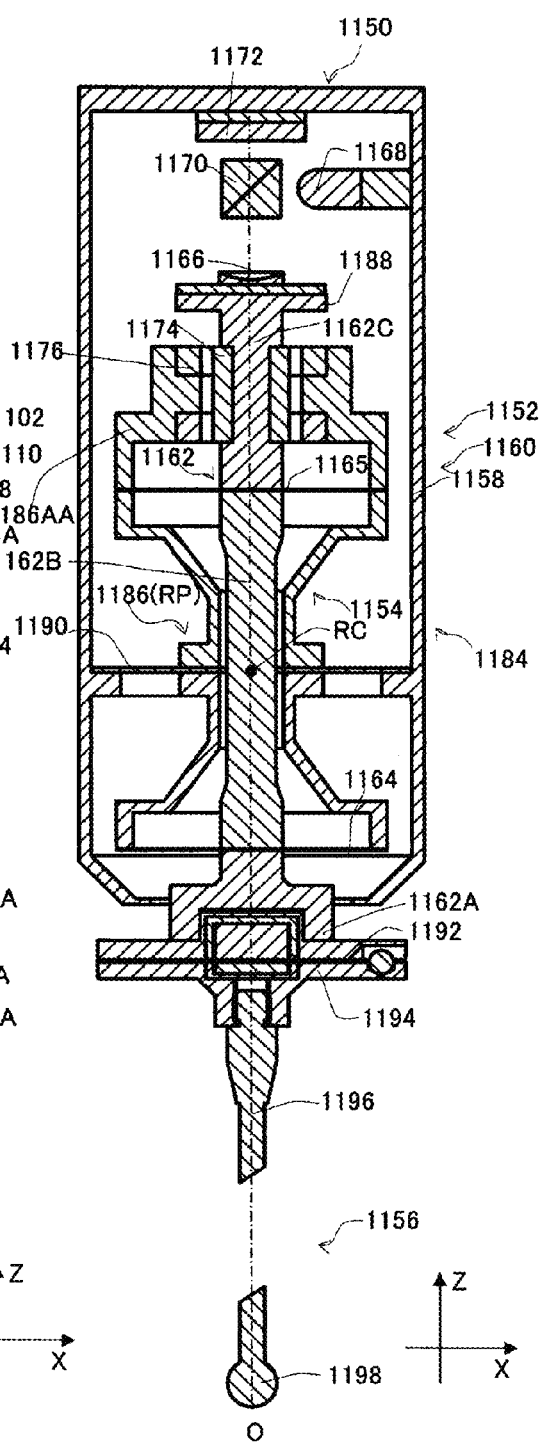

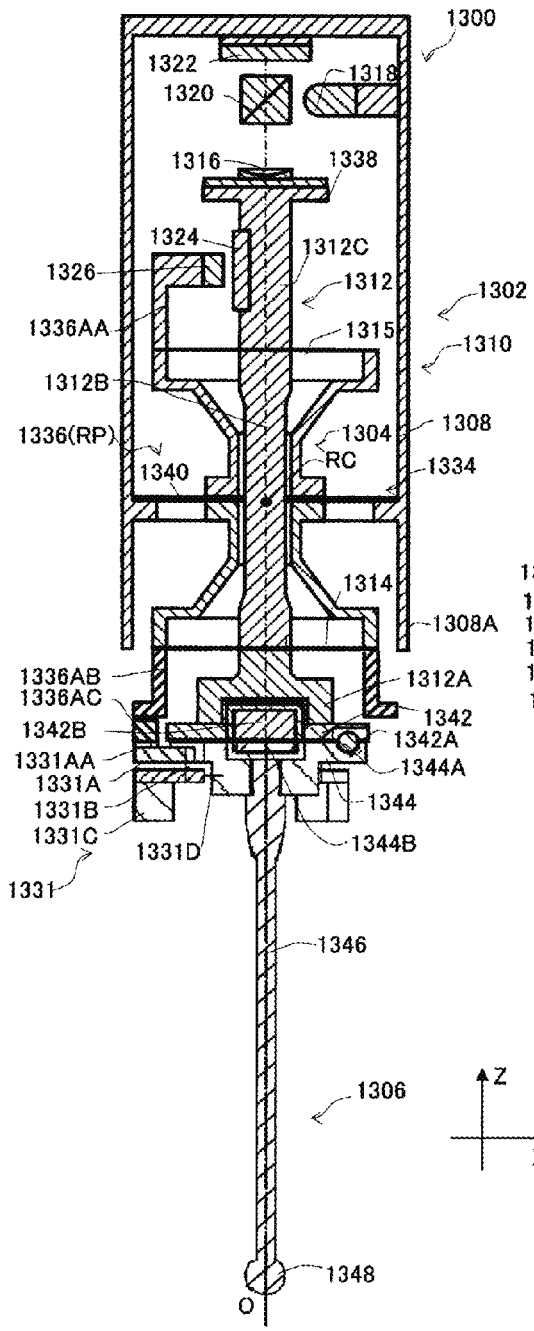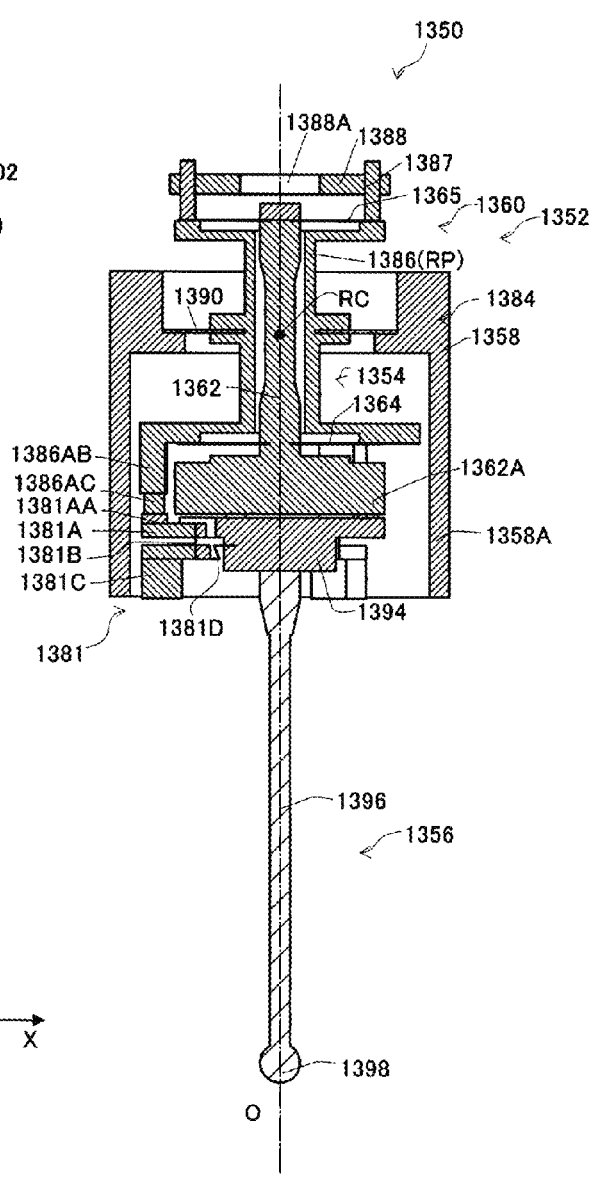

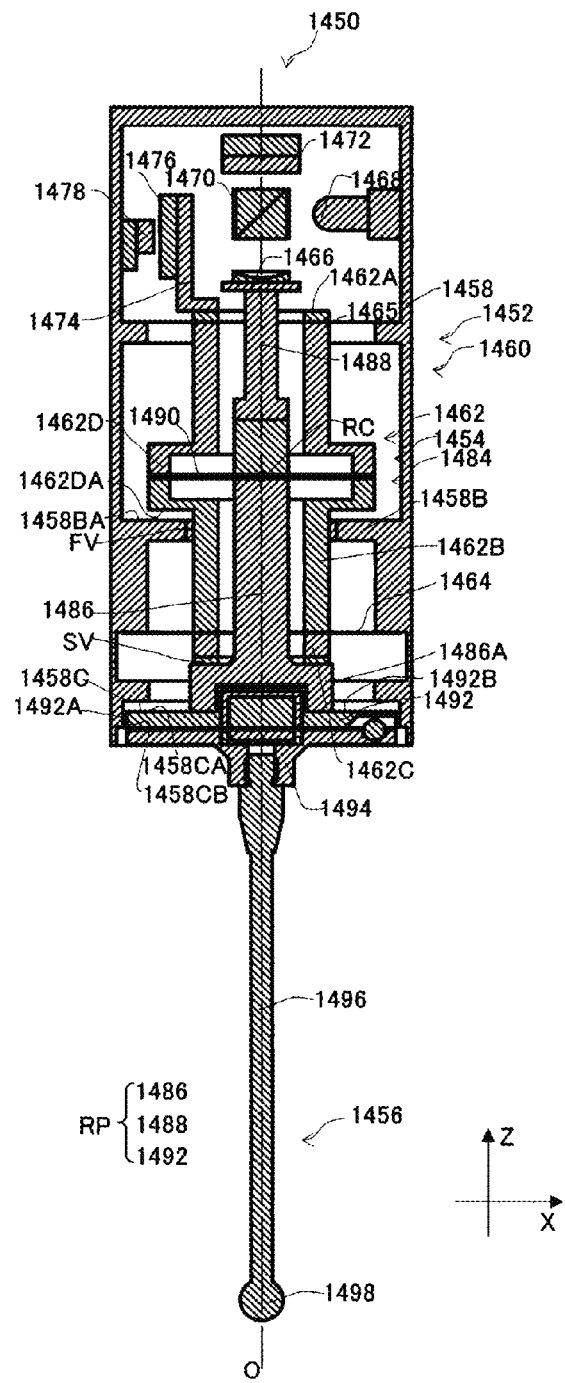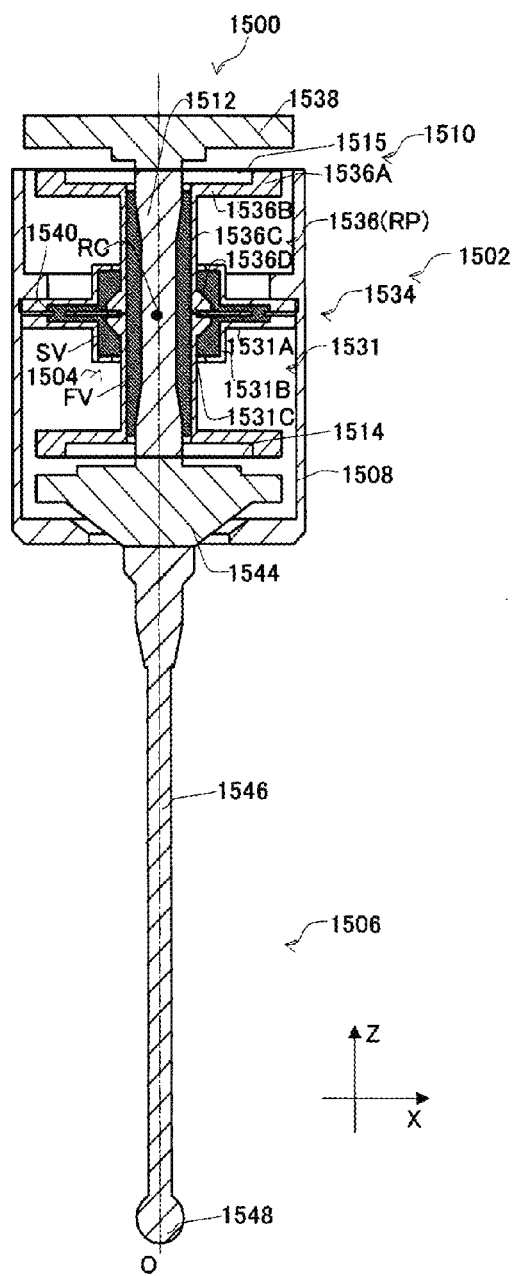

MEASURING PROBE FOR MEASURING A THREE-DIMENSIONAL SHAPE OF AN OBJECT TO BE MEASURED

CROSS-REFERENCE TO RELATED APPLICATION

The disclosure of Japanese Patent Application No. 2015-043035 filed on Mar. 5, 2015 including specifications, drawings and claims is incorporated herein by reference in its entirety.

TECHNICAL FIELD

The present invention relates to a measuring probe, and more particularly, to a measuring probe capable of ensuring high measurement accuracy while keeping a low cost.

BACKGROUND ART

A three-dimensional measuring machine, for example, has been known as a measuring apparatus for measuring a surface shape of an object to be measured by contacting with the surface thereof. Japanese Patent No. 4417114 (hereinafter referred to as Patent Literature 1) describes a three-dimensional measuring machine employing a measuring probe that comes into contact with an object to be measured to detect the surface shape thereof. The measuring probe illustrated in Patent Literature 1 includes: a stylus having a contact part to be in contact with (a surface of) an object to be measured; an axial motion mechanism including a moving member that allows the contact part to move in a central axis direction (also referred to as a Z direction or an axial direction O) of the measuring probe; and a rotary motion mechanism including a rotating member that allows the contact part to move along a surface perpendicular to the Z direction by means of rotary motion. In Patent Literature 1, the axial motion mechanism and the rotary motion mechanism are connected in series and their directions in which the contact part of the stylus can move are set to be different from each other.

SUMMARY OF INVENTION

Technical Problem

The shape of an object W to be measured can be obtained from displacement of the rotating member and the moving member. In Patent Literature 1, the moving member is supported by the rotary motion mechanism and displacement of the moving member is detected as displacement in the Z direction. Thus, if the moving member is displaced while being tilted with respect to the Z direction by the rotating member, for example, the moving member is displaced basically in three directions, i.e., XYZ directions. Thus, a detector (displacement detector) that performs detection by extracting only a displacement component in one direction (Z direction) of these three directions needs to be employed in Patent Literature 1. Therefore, an attempt to fabricate a measuring probe with high measurement accuracy by using the technology of Patent Literature 1 may lead to a complicated detection process and a high cost of such a detector (due to the limited type of detector).

The present invention has been made in order to solve the above-described problems in the conventional technique, and an object thereof is to provide a measuring probe capable of ensuring high measurement accuracy while keeping a low cost.

Solution to Problem

A first aspect of the present invention provides a measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by means of rotary motion. The measuring probe solves the above-described problems by including an axial element housing member that supports the axial motion mechanism, a rotary element housing member that supports the rotary motion mechanism, and a displacement detector supported by the axial element housing member, for detecting displacement of the moving member.

A second aspect of the present invention provides the above-described measuring probe, wherein the displacement detector outputs a relative position detection signal that allows detection of a relative position of the moving member.

A third aspect of the present invention provides the above-described measuring probe, wherein the displacement detector outputs an absolute position detection signal that allows detection of an absolute position of the moving member.

A fourth aspect of the present invention provides the above-described measuring probe, wherein the axial element housing member is provided with an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes, and the displacement detector can detect a phase shift of the plurality of interference fringes generated in the interference optical system.

A fifth aspect of the present invention provides the above-described measuring probe, wherein the axial motion mechanism supports the rotary element housing member, and the rotating member supports the stylus.

A sixth aspect of the present invention provides the above-described measuring probe, wherein the rotary motion mechanism supports the axial element housing member, and the moving member supports the stylus.

A seventh aspect of the present invention provides the above-described measuring probe wherein the rotating member includes a balancing member on a side opposite to the stylus with respect to a rotation center of the rotary motion mechanism, and a distance between the rotation center and the balancing member is adjustable.

An eighth aspect of the present invention provides the above-described measuring probe including: a balance weight corresponding to mass of the stylus; and a counterbalance mechanism supported by the axial element housing member, for keeping the stylus and the balance weight in balance.

A ninth aspect of the present invention provides the above-described measuring probe including a preceding housing member that detachably couples and supports a housing member that supports both of the moving member and the rotating member with an engagement part capable of positioning the housing member, and wherein a reference member is provided on an opposite end to the stylus of a member directly supporting the stylus, and an orientation detector for detecting displacement of the reference member corresponding to a rotary movement of the stylus is housed in the preceding housing member.

A tenth aspect of the present invention provides the above-described measuring probe, wherein a reference member is provided on an opposite end to the stylus of a member directly supporting the stylus, and an orientation detector for detecting displacement of the reference member corresponding to a rotary movement of the stylus is housed in a housing member that supports both of the moving member and the rotating member.

An eleventh aspect of the present invention provides the above-described measuring probe, wherein the axial motion mechanism includes a plurality of first diaphragm structures that allow the moving member to be displaced, and the orientation detector is disposed between the rotary motion mechanism and the plurality of first diaphragm structures when the rotary motion mechanism is supported by the axial motion mechanism.

A twelfth aspect of the present invention provides the above-described measuring probe, wherein the reference member is a reflecting mirror for reflecting light, the measuring probe includes a light source for causing light to be incident on the reflecting mirror along an optical axis, and the orientation detector detects displacement of reflected light reflected from the reflecting mirror from the optical axis.

A thirteenth aspect of the present invention provides the above-described measuring probe, wherein the optical axis is provided so as to pass through the rotation center of the rotary motion mechanism.

A fourteenth aspect of the present invention provides the above-described measuring probe, wherein the axial motion mechanism includes a plurality of first diaphragm structures that allow the moving member to be displaced, and the measuring probe includes a first limiting member for limiting an amount of deformation in the plurality of first diaphragm structures within a range of elastic deformation.

A fifteenth aspect of the present invention provides the above-described measuring probe, wherein the rotary motion mechanism includes a second diaphragm structure that allows the rotating member to be displaced, and the measuring probe includes a second limiting member for limiting an amount of deformation in the second diaphragm structure within a range of elastic deformation.

A sixteenth aspect of the present invention provides the above-described measuring probe, wherein at least part of a gap between a first wall member, which is disposed so as to face the moving member and to be integral with the axial element housing member, and the moving member, is filled with a first viscous material.

A seventeenth aspect of the present invention provides the above-described measuring probe wherein the rotary motion mechanism includes a second diaphragm structure that allows the rotating member to be displaced, and at least part of a gap between a second wall member, which is disposed to be integral with the rotary element housing member, and any one of the second diaphragm structure and the rotating member, is filled with a second viscous material.

In the present invention, high measurement accuracy can be ensured while keeping a low cost. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein:

FIG. 14A is a schematic diagram illustrating a cross section of a measuring probe according to a thirteenth embodiment of the present invention, and FIG. 14B is a schematic diagram illustrating a cross section of a measuring probe according to a fourteenth embodiment of the present invention;

FIG. 17A is a schematic diagram illustrating a cross section of a measuring probe according to a seventeenth embodiment of the present invention, and FIG. 17B is a schematic diagram illustrating a cross section of a measuring probe according to an eighteenth embodiment of the present invention;

FIG. 19A is a schematic diagram illustrating a cross section of a measuring probe according to a twentieth embodiment of the present invention, and FIG. 19B is a schematic diagram illustrating a cross section of a measuring probe according to a twenty-first embodiment of the present invention.

DESCRIPTION OF EMBODIMENTS

Embodiments of the present invention will be described below in detail with reference to the drawings.

The first embodiment according to the present invention will now be described with reference to FIGS. 1 to 4.

The general configuration of a measuring system 100 will be described first.

Figure 1:
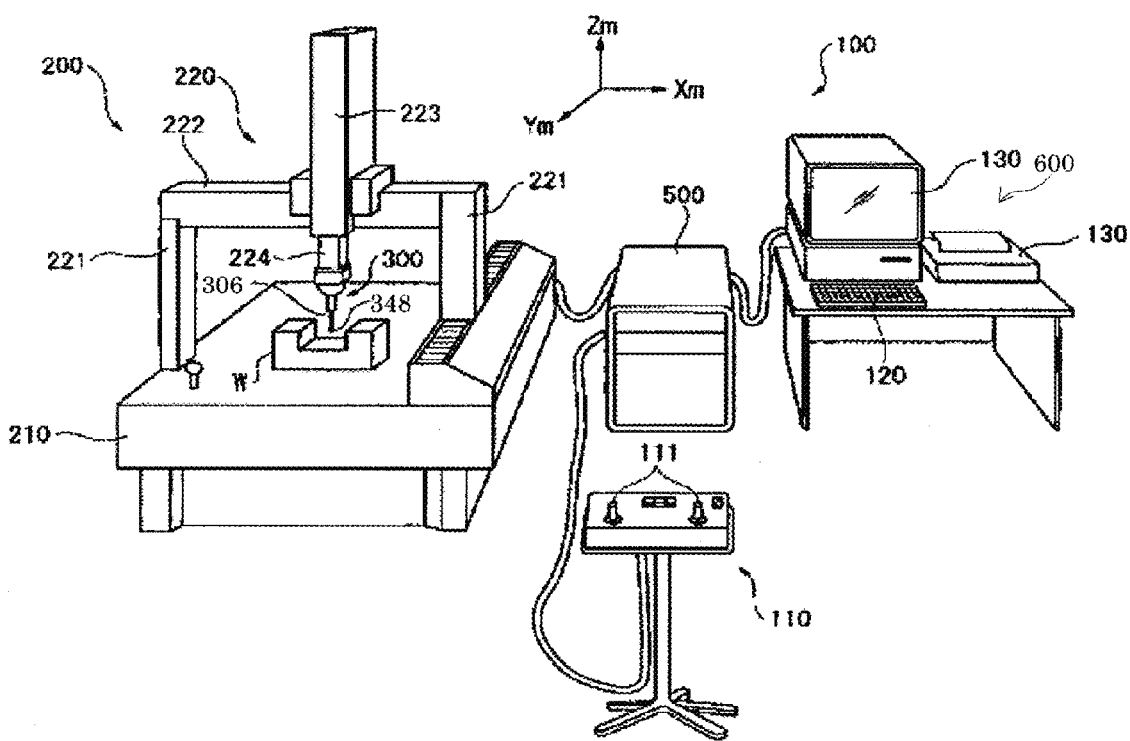
FIG. 1 is a schematic diagram illustrating an example of a measuring system that employs a measuring probe according to the present invention.

As shown in FIG. 1, the measuring system 100 includes: a three-dimensional measuring machine 200 that moves a measuring probe 300; an operation part 110 having manually-operated joysticks 111; and a motion controller 500 that controls movements of the three-dimensional measuring machine 200. The measuring system 100 further includes: a host computer 600 that operates the three-dimensional measuring machine 200 via the motion controller 500 and processes measured data obtained by the three-dimensional measuring machine 200 to determine, for example, the dimension and shape of an object W to be measured; input unit 120 for inputting, for example, measurement conditions; and output unit 130 for outputting a result of measurement.

Components of the measuring system 100 will be described next.

As shown in FIG. 1, the three-dimensional measuring machine 200 includes: the measuring probe 300; a surface plate 210; a drive mechanism 220 provided to stand on the surface plate 210, for moving the measuring probe 300 three-dimensionally; and a drive sensor 230 that detects a drive amount of the drive mechanism 220.

Figure 2:
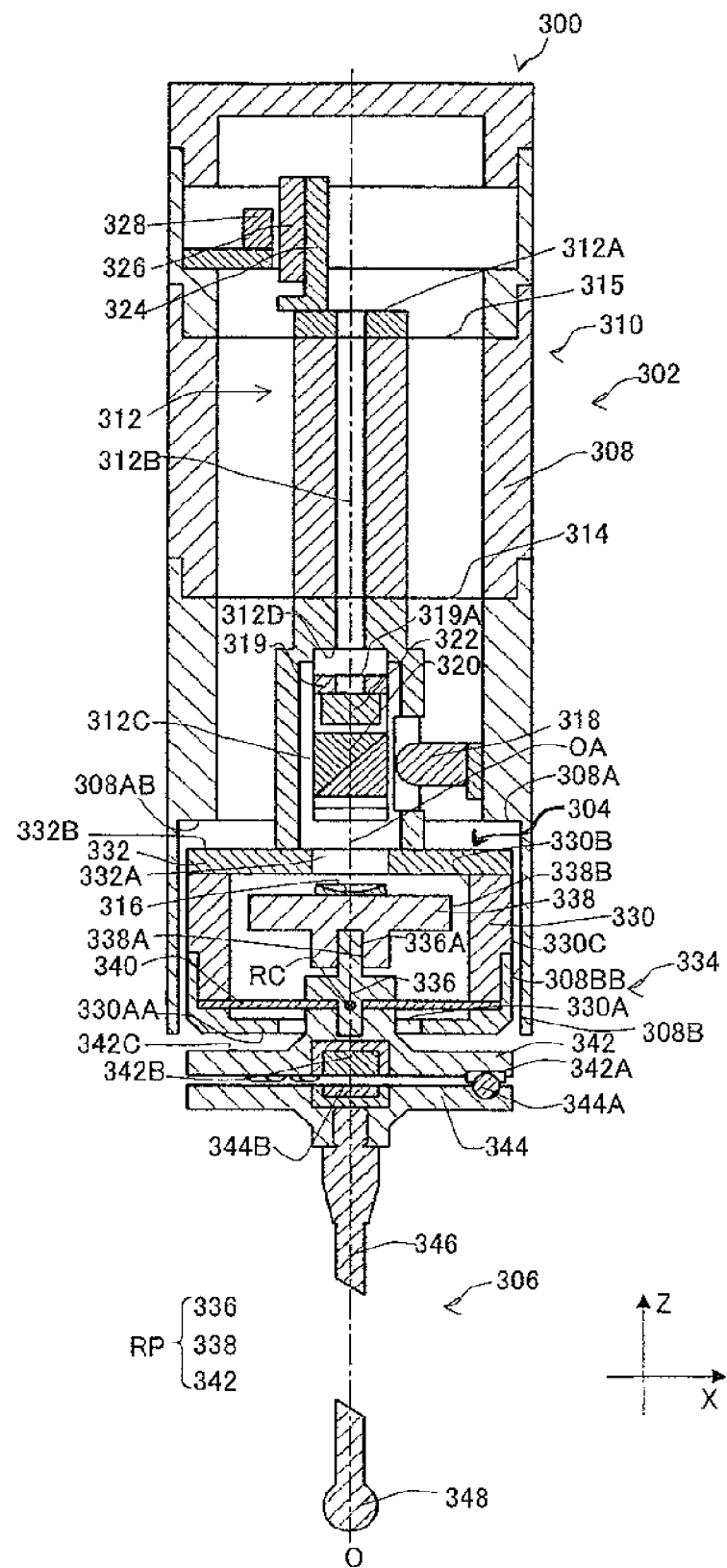
FIG. 2 is a schematic diagram illustrating a cross section of a measuring probe according to a first embodiment of the present invention.

As shown in FIG. 2, the measuring probe 300 includes: a stylus 306; an axial motion mechanism 310; and a rotary motion mechanism 334. When coming into contact with a surface S of the object W to be measured, a contact part 348 of the stylus 306 can freely change its position in three directions along the shape of the surface S by means of the axial motion mechanism 310 and the rotary motion mechanism 334.

The general configuration of the measuring probe 300 will be further described with reference to FIG. 2. Note that for the purpose of illustration, the longitudinal direction on the plane of paper in FIG. 2 is defined as a Z direction, the horizontal direction on the plane of the paper is defined as an X direction, and the perpendicular direction to the plane of the paper is defined as a Y direction. Thus, the direction of a central axis O (axial direction O) of the measuring probe 300 coincides with the Z direction.

As shown in FIG. 2, the measuring probe 300 includes: the stylus 306 having the contact part 348 to be in contact with the object W to be measured; the axial motion mechanism 310 having a moving member 312 that allows the contact part 348 to move in the axial direction O; and the rotary motion mechanism 334 having a rotating member RP that allows the contact part 348 to move along the plane perpendicular to the axial direction O by means of rotary motion. The axial motion mechanism 310 is supported by a main body housing (axial element housing member) 308 and the rotary motion mechanism 334 is supported by a module housing (rotary element housing member) 330. The axial motion mechanism 310 supports the module housing 330 and the rotating member RP directly supports the stylus 306. The measuring probe 300 also includes a displacement detector 328, which is supported by the main body housing 308, for detecting displacement of the moving member 312.

In the measuring probe 300, a probe main body 302 supports the stylus 306 as shown in FIG. 2. More specifically, the measuring probe 300 includes two modules, i.e., the probe main body 302 and a rotary module 304, and the probe main body 302 incorporates the rotary module 304. An orientation detector 322 (which will be described later) is incorporated in the probe main body 302 including the main body housing (housing member) 308 that supports both the moving member 312 and the rotating member RP (i.e., the orientation detector 322 is housed in the main body housing 308). Note that being "incorporated" herein means that a member to be "incorporated" is supported radially inside of its corresponding housing member (e.g., the main body housing 308 when a member to be "incorporated" is "incorporated" in the probe main body 302; or the module housing 330 when a member to be "incorporated" is "incorporated" in the rotary module 304) and has no portion entirely positioned inside of other module(s) or other housing member(s) disposed outside the corresponding housing member.

The measuring probe 300 will be described below in detail.

Figure 3:
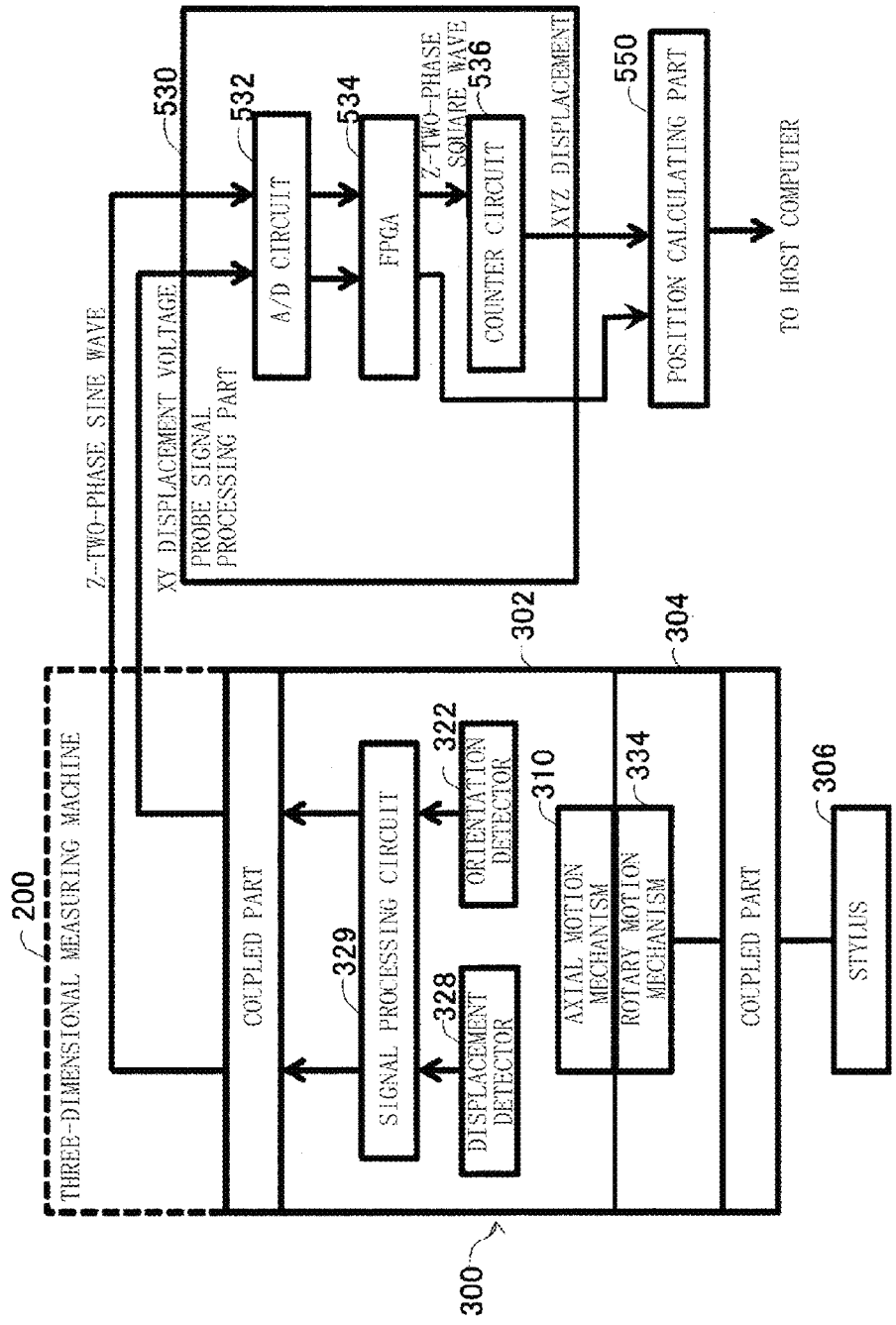
FIG. 3 is a block diagram illustrating a configuration of the measuring probe and peripherals thereof.

As shown in FIG. 2, the probe main body 302 includes: the main body housing 308; the axial motion mechanism 310; the rotary module 304; the orientation detector 322; the displacement detector 328; and a signal processing circuit 329 (FIG. 3).

As shown in FIG. 2, the main body housing 308 has a cylindrical shape with a cover and includes a stepped portion 308A on an inner side surface thereof. The main body housing 308 supports the axial motion mechanism 310 radially inside thereof above the stepped portion 308A in the Z direction. Moreover, the main body housing 308 houses the rotary module 304 on a radially inner side of a thin extended portion 308B provided below the stepped portion 308A in the Z direction.

As shown in FIG. 2, the axial motion mechanism 310 includes: the moving member 312; and a pair of first diaphragm structures 314 and 315 that allows the moving member 312 to be displaced with respect to the main body housing 308.

As shown in FIG. 2, the moving member 312 has a generally cylindrical shape having a hollow portion 312B around its axial center. The moving member 312 includes a depressed portion 312C in a lower part, in the Z direction, of an area supported by the first diaphragm structure 314. A supporting member 319 extends from the inner side surface of the main body housing 308 so as not to be in contact with the depressed portion 312C. The orientation detector 322 and a beam splitter 320 are supported by the supporting member 319. The lower end of the moving member 312 supports the rotary module 304 including the rotary motion mechanism 334. More specifically, the orientation detector 322 is disposed between the rotary motion mechanism 334 and the pair of first diaphragm structures 314 and 315.

Figure 4A:
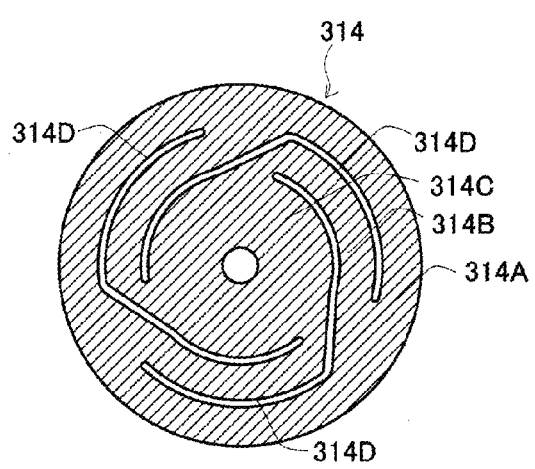
FIG. 4A is a schematic diagram illustrating an example of a first diaphragm structure used in an axial motion mechanism of the measuring probe.

As shown in FIG. 4A, each of the first diaphragm structures 314 and 315 is an elastically-deformable member having a generally disk shape. An example of a material for the first diaphragm structures 314 and 315 is phosphor bronze (other materials may be used). Here, the first diaphragm structure 315 is identical with the first diaphragm structure 314 (without being limited thereto, the first diaphragm structures 314 and 315 may have shapes different from each other). Thus, only the first diaphragm structure 314 will be described with reference to FIG. 4A.

As shown in FIG. 4A, the first diaphragm structure 314 is provided with three cutout portions 314D out of phase with one another by 120 degrees in the circumferential direction thereof. Due to the cutout portions 314D, a peripheral portion 314A, a rim portion 314B, and a central portion 314C are provided from the outer side toward the inner side of the first diaphragm structure 314 in the radial direction. The peripheral portion 314A is positioned at the outermost peripheral portion of the first diaphragm structure 314 and is a portion to be fixed to the main body housing 308. The rim portion 314B has a strip shape in the circumferential direction due to the two adjacent cutout portions 314D and is disposed on the inner side of the peripheral portion 314A. Opposite ends of the rim portion 314B are coupled to the peripheral portion 314A and the central portion 314C, respectively. The central portion 314C is a portion for supporting the moving member 312 and disposed on the inner side of the rim portion 314B. Displacement of the moving member 312 with respect to the main body housing 308 causes the central portion 314C of the first diaphragm structure 314 to move in a vertical direction and causes the rim portion 314B to be elastically deformed. Note that the configuration of the first diaphragm structure is not limited to the shape described in the present embodiment (this applies also to the second diaphragm structure).

As shown in FIG. 2, the rotary module 304 includes: a flange part 332, the module housing 330, and the rotary motion mechanism 334.

As shown in FIG. 2, the flange part 332 is coupled to the moving member 312 and has a flange shape with an opening 332A at its center.

As shown in FIG. 2, the module housing 330 is a generally-cylindrical member having an opening 330A at a lower end thereof. The module housing 330 supports the rotary motion mechanism 334 radially inside thereof.

As shown in FIG. 2, the rotary motion mechanism 334 is housed within the module housing 330 except for a flange member 342. The flange member 342 is coupled to the stylus 306 without penetrating into the stylus 306. As shown in FIG. 2, the rotary motion mechanism 334 includes: the rotating member RP; and a second diaphragm structure 340 that allows the rotating member RP to be displaced with respect to the module housing 330.

As shown in FIG. 2, the rotating member RP is a member supported by the second diaphragm structure 340 and includes a balancing member 338, an upper member 336, and the flange member 342.

As shown in FIG. 2, the balancing member 338 is disposed above the second diaphragm structure 340 and has a weight corresponding to the stylus 306 (more specifically, the rotating member RP has the balancing member 338 on the side opposite to the stylus 306 with respect to a rotation center RC of the rotary motion mechanism 334). Appropriately setting the balancing member 338 (or adjusting a distance between the rotation center RC and the balancing member 338 as will be described later) allows the center of gravity of the members, including the stylus 306, supported by the rotating member RP to coincide with the rotation center RC. This can prevent the central axis of the stylus 306 from greatly tilting from the axial direction O even when the measuring probe 300 is in the horizontal position, for example. In other words, the stylus 306 can stay at the center in a measurement range of the orientation detector 322 (which will be described later) even when the orientation of the measuring probe 300 is changed. This allows the employment of a simpler, smaller, higher-resolution orientation detector 322. A reference member 316 is provided on the upper end of the balancing member 338 (end of the rotating member RP opposite to the stylus 306). Note that a distance between a side surface 338B of the balancing member 338 and an inner side surface 330B of the module housing 330 is determined to regulate a tilt (displacement) of the balancing member 338 so that an amount of deformation in the second diaphragm structure 340 falls within the range of elastic deformation. In other words, it can be said that the rotary module 304 includes the module housing 330 and the balancing member 338 together serving as a second limiting member for limiting an amount of deformation in the second diaphragm structure 340 within the range of elastic deformation.

As shown in FIG. 2, the upper member 336 engages with the second diaphragm structure 340 to support the balancing member 338. Note that a protruding portion 336A of the upper member 336 is provided with an external thread. A depressed portion 338A of the balancing member 338 corresponding to the protruding portion 336A is provided with an internal thread. This allows a distance between the rotation center RC and the balancing member 338 to be adjusted by changing a state of screwing between the balancing member 338 and the upper member 336. Thus, even with styluses 306 having different weights or lengths, changing a distance between the balancing member 338 and the rotation center RC allows the center of gravity of the rotating member RP (member supported by the second diaphragm structure 340) to coincide with the rotation center RC.

Figure 4B:
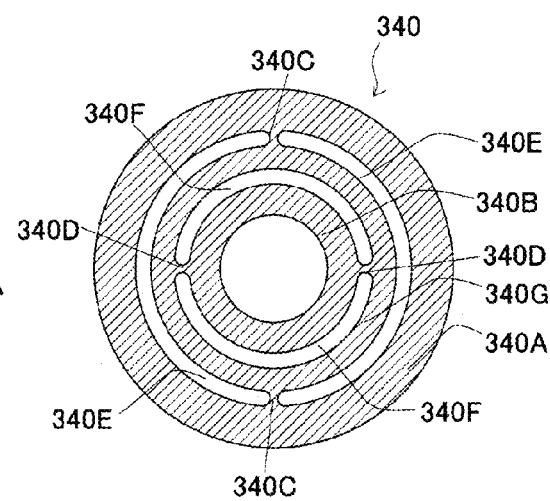
FIG. 4B is a schematic diagram illustrating an example of a second diaphragm structure used in a rotary motion mechanism of the measuring probe.

As shown in FIG. 4B, the second diaphragm structure 340 is also an elastically-deformable member having a generally disk shape. An example of a material for the second diaphragm structure 340 is phosphor bronze (other materials may be used). The second diaphragm structure 340 is provided with two arc-shaped cutout portions 340E out of phase with each other by 180 degrees in the circumferential direction thereof, and two hinge portions 340C are formed therebetween. Two arc-shaped cutout portions 340F out of phase with each other by 180 degrees in the circumferential direction are further provided on a radially inner side of the cutout portions 340E and two hinge portions 340D are formed therebetween. Due to the cutout portions 340E and 340F, a peripheral portion 340A, a rim portion 340G, and a central portion 340B are provided from the outer side toward the inner side of the second diaphragm structure 340 in the radial direction.

As shown in FIG. 4B, the peripheral portion 340A is positioned at the outermost peripheral portion of the second diaphragm structure 340 and is a portion to be fixed to the module housing 330. The rim portion 340G has a strip shape in the circumferential direction due to the cutout portions 340E and 340F provided on both sides thereof in the radial direction. The rim portion 340G is disposed on the inner side of the peripheral portion 340A. The rim portion 340G is connected to the peripheral portion 340A via the hinge portion 340C and connected to the central portion 340B via the hinge portion 340D. The central portion 340B is a portion for supporting the upper member 336 and disposed on the inner side of the rim portion 340G. The cutout portions 340E and 340F are out of phase with each other by 90 degrees. Thus, the central portion 340B is tiltable (rotatable) in two directions perpendicular to each other with the center of the second diaphragm structure 340 (rotation center RC) used as an axis.

Figure 4C:
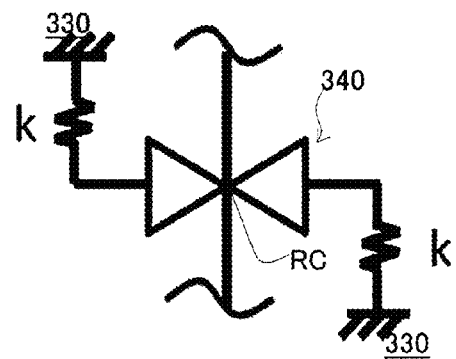
FIG. 4C is a functional diagram of the second diaphragm structure used in the rotary motion mechanism.

FIG. 4C is a schematic diagram illustrating a function of the second diaphragm structure 340. Note that the character k denotes a restoring force per unit displacement (angle) when the central portion 340B is displaced (rotated).

As shown in FIG. 2, the flange member 342 is supported by the upper member 336 while interposing the second diaphragm structure 340 therebetween. Along a periphery on a lower end of the flange member 342, one pair of rollers 342a is provided at each of positions at intervals of 120 degrees in the circumferential direction thereof, i.e., totally three pairs of rollers 342A are provided at intervals of 120 degrees in the circumferential direction thereof. A permanent magnet 342B is provided on the central axis O. Note that the axial direction of the pair of rollers 342A coincides with an approximately radial direction toward the center of the flange member 342.

Note that a distance between a lower end 308AB of the stepped portion 308A and an upper end 332B of the flange part 332 is determined so that an amount of deformation in the pair of first diaphragm structures 314 and 315 falls within the range of elastic deformation. In other words, it can be said that the probe main body 302 includes the main body housing 308, the moving member 312, the supporting member 319, and the module housing 330 together serving as a first limiting member for limiting an amount of deformation in the pair of first diaphragm structures 314 and 315 within the range of elastic deformation. Note that the extended portion 308B can also prevent an external force from being applied directly to the rotary module 304 from an XY direction. As a matter of course, the stylus 306 is configured to drop off when an excessively large load is applied to the stylus 306 before the first limiting member acts in order to protect the first diaphragm structures 314 and 315.

On the other hand, a scale bracket 324 is disposed on an upper end 312A of the moving member 312 as shown in FIG. 2. A reference member 326 is disposed on the scale bracket 324. The displacement detector 328 that detects reflected light from the reference member 326 is disposed to face the reference member 326. Note that the displacement detector 328 incorporates a light source for emitting light to the reference member 326. Incremental patterns having different reflectances for light from the light source are provided at predetermined intervals in the Z direction on a surface of the reference member 326 closer to the displacement detector 328. In other words, the reference member 326 is a reflective scale. The reference member 326 and the displacement detector 328 constitute a photoelectric incremental linear encoder that outputs a two-phase sinusoidal signal. More specifically, the displacement detector 328 is supported by the main body housing 308 and detects displacement of the moving member 312. Corresponding to the displacement of the moving member 312, the displacement detector 328 outputs a periodic signal repeated in predetermined cycles of incremental patterns (i.e., the displacement detector 328 is configured to output a relative position detection signal that allows detection of the relative position of the moving member 312). This periodic signal is waveshaped by the signal processing circuit 329. A Z-two-phase sine wave for obtaining displacement of the reference member 326 in the Z direction is outputted from the signal processing circuit 329.

As shown in FIG. 2, another light source 318 is provided on the inner side surface of the main body housing 308 so as to face the beam splitter 320. The beam splitter 320 directs light outputted from the light source 318 in the Z direction. The light directed in the Z direction (light passing through an optical axis OA) is reflected by the reference member 316 (which is a reflecting mirror for reflecting light) provided on the end of the rotating member RP opposite to the stylus 306 (i.e., the probe main body 302 is provided with the light source 318 for causing light to be incident on the reference member 316 along the optical axis OA). The reflected light passes through the beam splitter 320 and the orientation detector 322 detects the light reflected from the reference member 316. Thus, displacement (tilt) of the reference member 316 changes the position of the reflected light detected by the orientation detector 322. This allows the orientation detector 322 to detect the displacement of the reflected light, which is reflected from the reference member 316, from the optical axis OA. Thus, the orientation detector 322 can detect the displacement (tilt) of the reference member 316 corresponding to the rotary movement of the stylus 306. The optical axis OA is provided so as to pass through the rotation center RC of the rotary motion mechanism 334 (i.e., the central axis O coincides with the optical axis OA).

As shown in FIG. 2, the reference member 316 has a concave surface so as to reduce an amount of displacement from the optical axis OA in the reflected light detected by the orientation detector 322 and thus achieve the miniaturization of the orientation detector 322. An output from the orientation detector 322 is also inputted to the signal processing circuit 329. The output from the orientation detector 322 is then wave-shaped by the signal processing circuit 329. A displacement voltage (XY displacement voltage) based on the displacement of the reflected light in the XY direction from the optical axis OA, which is caused by the change in the orientation of the reference member 316, is outputted from the signal processing circuit 329.

As shown in FIG. 2, the stylus 306 includes: a flange part 344; a rod part 346; and the contact part 348.

As shown in FIG. 2, the flange part 344 is a member corresponding to the flange member 342. More specifically, three balls 344A are disposed at intervals of 120 degrees in the circumferential direction of the flange part 344 so as to be each in contact with the pair of rollers 342A. A magnetic member 344B (which may be a permanent magnet) to be attracted to the permanent magnet 342B is disposed in the flange part 344 to face the permanent magnet 342B.

As shown in FIG. 2, the three balls 344A are each in contact with the surfaces of the corresponding pair of rollers 342A. Thus, in a state where the permanent magnet 342B and the magnetic member 344B are being attracted to each other by a predetermined force, the flange member 342 is seated on (in contact with) the flange part 344 at six points. In other words, the flange member 342 and the flange part 344 can be coupled to each other while achieving high positioning accuracy. More specifically, the flange part 344 and the flange member 342 together constitute a kinematic joint, which is a detachable coupling mechanism (it is referred to also as a kinematic coupling; the same applies hereinafter). Such a kinematic joint allows for a high degree of positioning reproducibility even when attachment and detachment between the stylus 306 and the flange member 342 are repeatedly performed. Note that the kinematic joint may be a combination of V-grooves and balls without being limited to the combination of the rollers and the balls. While employing the combination of the rollers and the balls, the order of their arrangement may be reversed. In other words, the present invention is not limited to the combination of the rollers and the balls as long as seating at six points can be achieved. When a large force is applied to the stylus 306 from a lateral direction (direction perpendicular to the axial direction O), the stylus 306 can drop off from the flange member 342 (including not only a case where no balls 344A are in contact with the rollers 342A but also a case where a part of the balls 344A is not in contact with the corresponding rollers 342A; the same applies hereinafter) to prevent the breakage of the probe main body 302 (therefore, the predetermined attracting force between the permanent magnet 342B and the magnetic member 344B is set to be a force corresponding to the aforementioned large force; the same applies hereinafter).

As shown in FIG. 2, a base end of the rod part 346 is attached to the flange part 344. A tip of the rod part 346 is provided with the spherical contact part 348. Note that when no displacement in the XY direction occurs in the stylus 306, the direction of the central axis of the stylus 306 coincides with the Z direction (axial direction O).

A probe signal processing part 530 will next be described with reference to FIG. 3.

As shown in FIG. 3, the probe signal processing part 530 includes: an analog-to-digital (A/D) circuit 532; an FPGA 534; and a counter circuit 536. The A/D circuit 532 performs analog-to-digital conversion of the Z-two-phase sine wave and the XY displacement voltage, which are inputted analog signals, in order to obtain respective digital signals thereof. More specifically, as the number of bits in this analog-to-digital conversion increases, a higher dynamic range and higher sensitivity to the displacement of the stylus 306 can be achieved. The FPGA 534 converts the XY displacement voltage, which is a digital signal, into a displacement signal and outputs the signal to a position calculating part 550. The FPGA 534 also converts the Z-two-phase sine wave, which is a digital signal, into a Z-two-phase square wave and outputs the Z-two-phase square wave to the counter circuit 536. The counter circuit 536 measures the Z-two-phase square wave to obtain the displacement in the Z direction and outputs the obtained result to the position calculating part 550.

In the present embodiment, in order to change the position of the stylus 306 in the XYZ direction, the axial motion mechanism 310 performs a movement in the Z direction and the rotary motion mechanism 334 performs a movement in the XY direction in principle. Thus, the displacement of the stylus 306 can be separated into components of the Z direction and the XY direction, thereby allowing displacements in the Z direction and the XY direction to be easily detected independently of each other. The position calculation can be therefore simplified. Also, detection sensitivity in the Z direction and that in the XY direction can be set independently of each other. In addition, the axial motion mechanism 310 supports the module housing 330 and the rotating member RP directly supports the stylus 306. Thus, the detection sensitivity by the rotary motion mechanism 334, positioned closer to the stylus 306, can be improved.

In the present embodiment, the displacement detector 328, which is supported by the main body housing 308, for detecting displacement of the moving member 312 is provided. More specifically, the displacement detector 328 supported by the main body housing 308 detects displacement of the moving member 312 (which moves in the Z direction without moving in the XY direction in principle) supported also by the main body housing 308. Thus, the displacement detector 328, even if it is not an expensive detector, can purely detect unidirectional displacement of the moving member 312 with respect to the main body housing 308. More specifically, the displacement detector 328 can detect displacement of the moving member 312 with a high resolution and can easily correct the displacement of the moving member 312. Also, a linear encoder, or the like, can be easily employed and the moving member 312 (i.e., the stylus 306) can have a long stroke.

In the present embodiment, the displacement detector 328 outputs a relative position detection signal (a periodic signal repeated in predetermined cycles) that allows the detection of the relative position of the moving member 312. Thus, constituting a photoelectric incremental linear encoder with the displacement detector 328 allows the avoidance of a phenomenon in which detection sensitivity varies according to a position to which the moving member 312 is moved while ensuring an extremely long detection range (dynamic range). Also, subjecting the relative position detection signal to analog-to-digital conversion with high bit number allows the detection of displacement in the Z direction with a higher resolution. Note that the displacement detector is not limited thereto. The displacement detector may be configured to detect not an incremental pattern but an absolute pattern. In other words, the displacement detector may be configured to output an absolute position detection signal that allows the detection of the absolute position of the moving member.

In the present embodiment, the axial motion mechanism 310 is supported by the pair of identical first diaphragm structures 314 and 315. Thus, occurrence of the displacement of the axial motion mechanism 310 in a direction other than the Z direction can be reduced, thus ensuring high movement accuracy in the Z direction. Also, increased responsivity can be achieved when compared with a case where an air bearing, or the like, is concurrently used for the guiding of the moving member. Note that the present invention is not limited thereto. Instead of employing the pair of identical first diaphragm structures, a single first diaphragm structure or three or more first diaphragm structures may be used. Alternatively, the first diaphragm structures may have shapes different from each other.

In the present embodiment, a distance between the rotation center RC and the balancing member 338 can be adjusted. Thus, even when the same balancing member 338 is employed for a plurality of styluses 306, the center of gravity of the rotating member RP to which any one of the styluses 306 is coupled can be made coincident with the rotation center RC by adjusting the position of the balancing member 338. In other words, the number of types of the balancing member 338 can be reduced, thus reducing the manufacturing and management costs of the balancing member 338. Note that the present invention is not limited thereto. The position of the balancing member may be unadjustable.

In the present embodiment, the reference member 316 is provided on the end of the rotating member RP opposite to the stylus 306, and the orientation detector 322 is housed in the main body housing 308. More specifically, since no orientation detector 322 is provided to the rotary module 304, the rotary module 304 itself can be downsized and a cost reduction can be therefore achieved. The reference member 316 is incorporated in the rotary module 304. Thus, when compared with a configuration in which the reference member protrudes and extends from the rotary module, a distance from the reference member 316 to the contact part 348 can be reduced. Therefore, a calculation error of the displacement of the contact part 348, which is calculated from the displacement of the reference member 316, can be reduced and thus the position of the contact part 348 can be obtained with high accuracy.

In the present embodiment, the orientation detector 322 is disposed between the rotary motion mechanism 334 and the pair of first diaphragm structures 314 and 315. Thus, a distance between the reference member 316 and the orientation detector 322 can be kept short even when the displacement of the rotating member RP is large. The orientation detector 322 can be therefore downsized. Thus, the probe main body 302 can be further downsized. In the present embodiment, the light source 318 that causes light to be incident on a reflecting mirror, or the reference member 316, along the optical axis OA is provided, and the orientation detector 322 detects the displacement of the reflected light, which is reflected from the reflecting mirror, from the optical axis OA. More specifically, since the orientation detector 322 performs detection in a contactless manner, the orientation detector 322 can detect the displacement of the rotating member RP with high sensitivity without inhibiting the rotary motion of the rotating member RP on which the reference member 316 is provided. Also, since the configuration for detecting the displacement of the rotating member RP is an optical lever and therefore simple, a cost reduction of the measuring probe 300 can be achieved. Note that the orientation detector is not limited thereto. A contact type orientation detector or a contactless type orientation detector utilizing magnetism, for example, may be employed.

In the present embodiment, the optical axis OA is provided so as to pass through the rotation center RC. Thus, a change in reflected light generated by the rotary movement of the rotating member RP contains no displacement component in the Z direction, and the displacement of the rotating member RP can be therefore detected with higher sensitivity. Note that the present invention is not limited thereto. The optical axis OA may be configured so as not to pass through the rotation center RC.

In the present embodiment, the probe main body 302 includes the main body housing 308, the moving member 312, the supporting member 319, and the module housing 330, which are for limiting an amount of deformation in the pair of first diaphragm structures 314 and 315 within the range of elastic deformation. Also, the rotary module 304 includes the module housing 330, the balancing member 338, and the flange member 342, which are for limiting an amount of deformation in the second diaphragm structure 340 within the range of elastic deformation. Thus, even when excessively large impact is applied to the stylus 306 in a direction along which the kinematic joint cannot function, for example, plastic deformation, breakage, or breakdown of the first diaphragm structures 314 and 315 and the second diaphragm structure 340 can be prevented from occurring. Note that the present invention is not limited thereto. The measuring probe may not include the member for limiting an amount of deformation in the first and second diaphragm structures within the range of elastic deformation.

Thus, in the present embodiment, high measurement accuracy can be ensured with a low cost.

Although the present invention has been described with reference to the above embodiment, the present invention is not limited thereto. In other words, modifications and design alterations can be made without departing from the scope of the present invention.

For example, although the probe main body 302 incorporates the rotary module 304 in the above embodiment, the present invention is not limited thereto. For example, the present invention may be configured as in the second embodiment shown in FIG. 5A. The second embodiment is different from the first embodiment mainly in a coupling state between a probe main body and a rotary module. Thus, for components excluding those associated with the coupling between the probe main body and the rotary module, basically the first two digits of their reference numerals are simply changed from the first embodiment and the description thereof will be omitted.

Figure 5A:
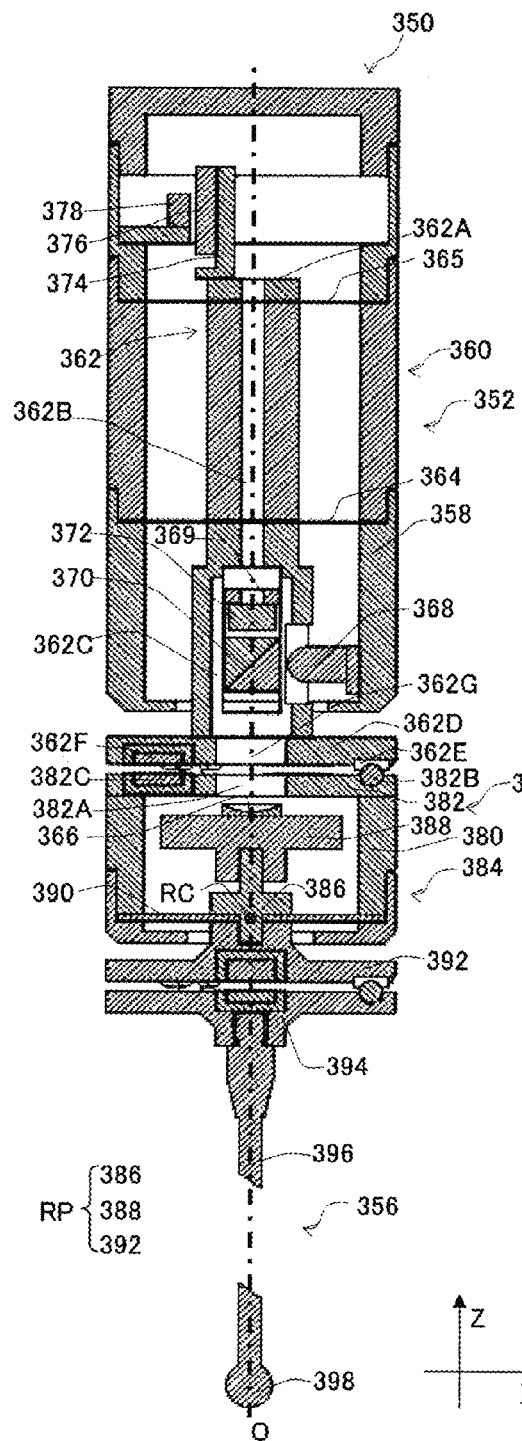
FIG. 5A is a schematic diagram illustrating a cross section of a measuring probe according to a second embodiment of the present invention.

In the second embodiment, a rotary module 354 is not incorporated in a probe main body 352 as shown in FIG. 5A. The rotary module 354 is detachably coupled to the probe main body 352 with a kinematic joint constituted by rollers 362E and balls 382B (engagement part). Note that the rotary module 354, which can be separated from the probe main body 352, is hereinafter referred to also as a probe module.

A plurality of styluses 356 (having contact parts 398 of different materials, at different positions, or with different weights, for example) are prepared. Corresponding to the styluses 356, a plurality of rotary modules 354 (the number thereof may not necessarily be the same as the number of the styluses 356) can be prepared for the single probe main body 352.

As shown in FIG. 5A, a lower end of an axial motion mechanism 360 is provided with a flange part 362D. Except for the flange part 362D, the axial motion mechanism 360 is housed in a main body housing 358. The flange part 362D is coupled to the rotary module 354 without penetrating into the rotary module 354.

As shown in FIG. 5A, along a periphery on a lower end of the flange part 362D, one pair of rollers 362E is provided at each of positions at intervals of 120 degrees in the circumferential direction thereof, i.e., totally three pairs of rollers 362E are provided at intervals of 120 degrees in the circumferential direction thereof. Three permanent magnets 362F are provided so as to be out of phase with the rollers 362E by 60 degrees in the circumferential direction. Note that the axial direction of the pair of rollers 362E coincides with an approximately radial direction toward the center of the flange part 362D.

As shown in FIG. 5A, the rotary module 354 includes: a module cover 382; a module housing 380; and a rotary motion mechanism 384. Note that according to the present embodiment, the module cover 382 and the module housing 380 together constitute a rotary element housing member.

As shown in FIG. 5A, the module cover 382 has a flange shape with an opening 382A at its center. The module cover 382 is a member corresponding to the flange part 362D. The module cover 382 is coupled to the flange part 362D by means of the detachable kinematic joint with the permanent magnets 362F and magnetic members 382C being attracted to each other by a predetermined force. Such a kinematic joint allows for a high degree of positioning reproducibility even when attachment and detachment between the rotary module 354 and the flange part 362D are repeatedly performed. When a large force is applied to the rotary module 354 from the lateral direction (direction perpendicular to the Z direction), the rotary module 354 can drop off from the flange part 362D to prevent the breakage of the probe main body 352.

In the present embodiment, as described above, the axial motion mechanism 360 is incorporated in the probe main body 352 and the rotary motion mechanism 384 is incorporated only in the rotary module 354. Suppose a case where at least the rotary motion mechanism 384 should be changed from the perspective of its performance when the stylus 356 to be employed is changed, for example. In such a case, simply by replacing the rotary module 354 without changing the probe main body 352, a force applied to the object W to be measured from the contact part 398 can be set at a desired measuring force, for example. Consequently, adequate detection sensitivity and a restoring force (a force to restore the displacement of the stylus 356) can be obtained in a measuring probe 350. Conversely, replacing the probe main body 352 with respect to the same rotary module 354 can be easily performed. When only the rotary motion mechanism 384 is broken or degraded in its performance, the function of the measuring probe 350 can be maintained simply by replacing the rotary module 354.

Moreover, by positioning the balls 382B at the same position in the plurality of rotary modules 354, the plurality of rotary modules 354 can be easily attached to or detached from the probe main body 352 and a high degree of positional reproducibility can be achieved.

In the present embodiment, a plurality of rotary modules 354 may be prepared for the single probe main body 352, and a different restoring force per unit displacement when the rotating member RP is displaced may be set for each of the plurality of rotary modules 354. Thus, a restoring force individually corresponding to the styluses 356 or objects W to be measured can be set, displacement in the XY direction can be detected with high sensitivity, and the detection range can be expanded easily. Also, damage to the object W to be measured, which is caused by the contact part 398, can be lessened. Note that the present invention is not limited thereto. A restoring force per unit displacement when the rotating member RP is displaced may not be changed for every probe module.

In the present embodiment, a distance between the rotation center RC and a balancing member 388 can be adjusted.

By preparing a plurality of rotary modules 354 for the single probe main body 352, the plurality of rotary modules 354 each having different balance can be obtained with the rotating members RP configured by the same elements. Thus, a cost reduction in the rotary module 354 can be achieved. Note that the present invention is not limited thereto. The position of the balancing member may be unadjustable.

In the present embodiment, a plurality of rotary modules 354 may be prepared for the single probe main body 352, and the balancing members 388 can have different mass for each of the plurality of rotary modules 354. Thus, by selecting the rotary module 354 having the balancing member 388 corresponding to each of the styluses 356, the center of gravity of the rotating member RP to which the stylus 356 is coupled can be made coincident with the rotation center RC. If adjustment in the position of the balancing member 388 is possible in a finer manner, rotary modules 354 more accurately adaptable to many more styluses 356 can be provided for the single probe main body 352.

Although an orientation detector 372 is disposed between the rotary motion mechanism 384 and a pair of first diaphragm structures 364 and 365 in the second embodiment, the present invention is not limited thereto. For example, the present invention may be configured as in the third embodiment shown in FIG. 5B. The third embodiment is different from the second embodiment mainly in the position of an orientation detector. Thus, for components excluding those associated with the position of the orientation detector, basically the first two digits of their reference numerals are simply changed from the second embodiment and the description thereof will be omitted.

Figure 5B:
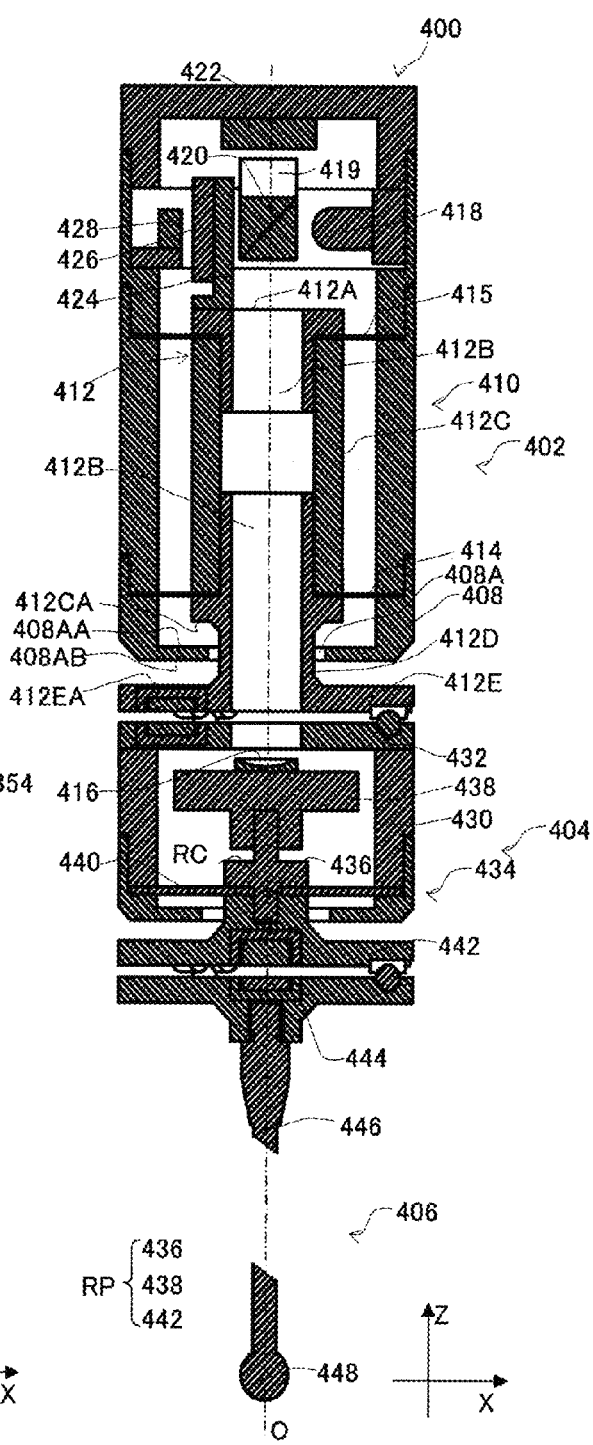
FIG. 5B is a schematic diagram illustrating a cross section of a measuring probe according to a third embodiment of the present invention.

In the third embodiment, a moving member 412 has a generally cylindrical shape having a hollow portion 412B around its axial center as shown in FIG. 5B. More specifically, the moving member 412 integrally includes: a thick portion 412C; a thin portion 412D; and a flange portion 412E from the upper part toward the lower part thereof in the Z direction. A pair of first diaphragm structures 414 and 415 are coupled to the thick portion 412C. The thin portion 412D is formed below the thick portion 412C. Note that a diameter of an opening 408A of a main body housing 408 is set to be smaller than an outer diameter of the thick portion 412C. An outer diameter of the flange portion 412E is set to be larger than the diameter of the opening 408A. Here, a distance between a lower end 412CA of the thick portion 412C and an upper end 408AA of the opening 408A and a distance between an upper end 412EA of the flange portion 412E and a lower end 408AB of the opening 408A are determined to regulate displacement of the moving member 412 in the Z direction so that an amount of deformation in the pair of first diaphragm structures 414 and 415 falls within the range of elastic deformation. In other words, it can be said that a probe main body 402 includes the main body housing 408 and the moving member 412 together serving as a first limiting member for limiting an amount of deformation in the pair of first diaphragm structures 414 and 415 within the range of elastic deformation.

As shown in FIG. 5B, an orientation detector 422 is disposed above the moving member 412 and on an inner upper surface of the main body housing 408. A light source 418 is provided on an inner side surface of the main body housing 408. A beam splitter 420 that directs light outputted from the light source 418 in the Z direction is supported by a supporting member 419 (note that the supporting member 419 is also fixed to the inner side of the main body housing 408). The light directed in the Z direction passes through the hollow portion 412B of the moving member 412 and is reflected by a reference member 416. The optical axis OA of the light directed in the Z direction is provided so as to pass through the rotation center RC of a rotary motion mechanism 434. In the present embodiment, this facilitates the arrangement of the orientation detector 422 and the manufacturing of the probe main body 402 can be easily achieved.

Although the displacement detector is used to constitute the photoelectric incremental linear encoder in the above embodiment, the present invention is not limited thereto. For example, the present invention may be configured as in the fourth embodiment shown in FIG. 6. The fourth embodiment is different from the second embodiment mainly in a configuration around a displacement detector. Thus, for components mainly excluding those around the displacement detector, basically the first two digits of their reference numerals are simply changed from the second embodiment and the description thereof will be omitted.

Figure 6:
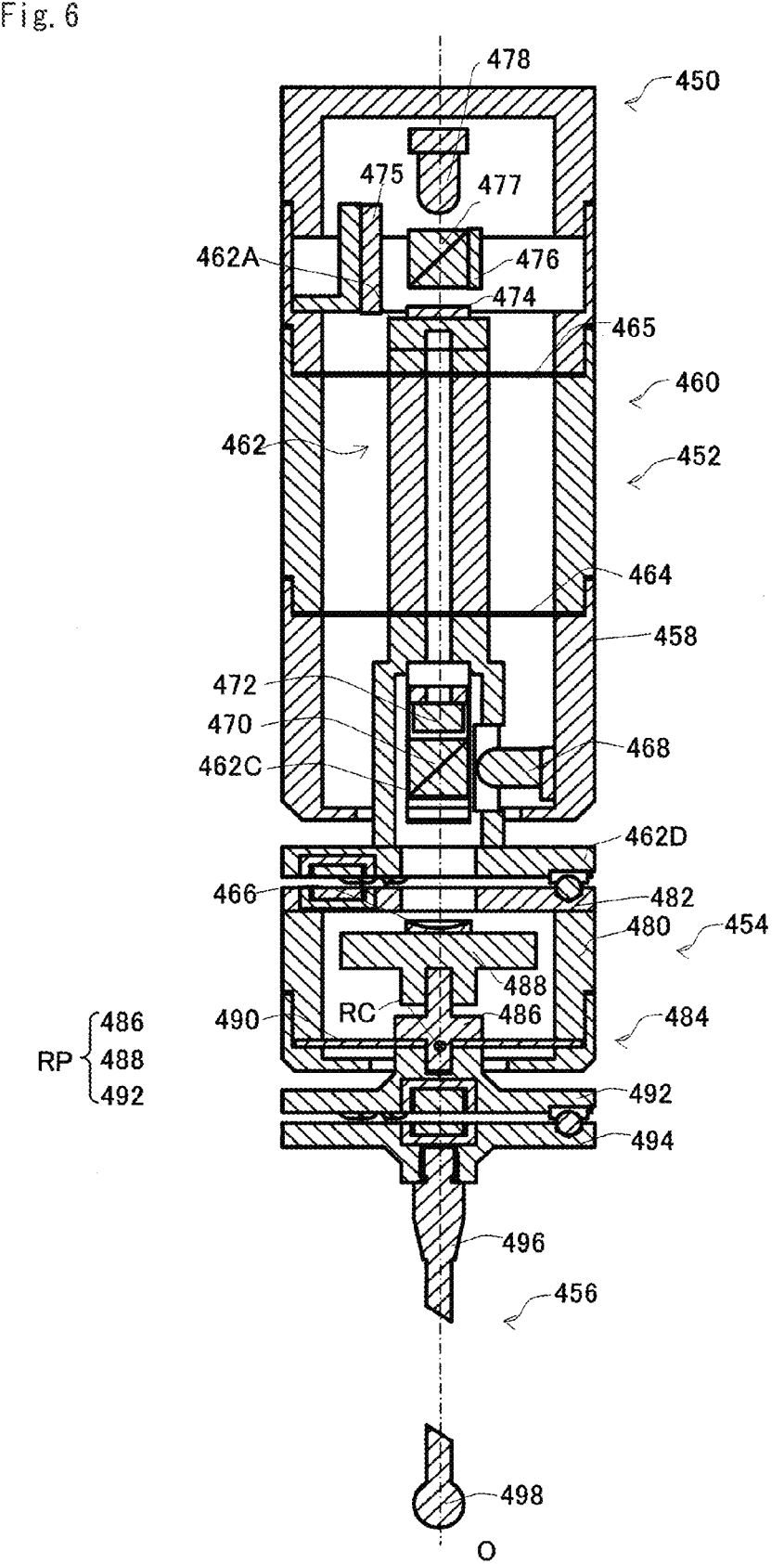
FIG. 6 is a schematic diagram illustrating a cross section of a measuring probe according to a fourth embodiment of the present invention.
Figure 7A:
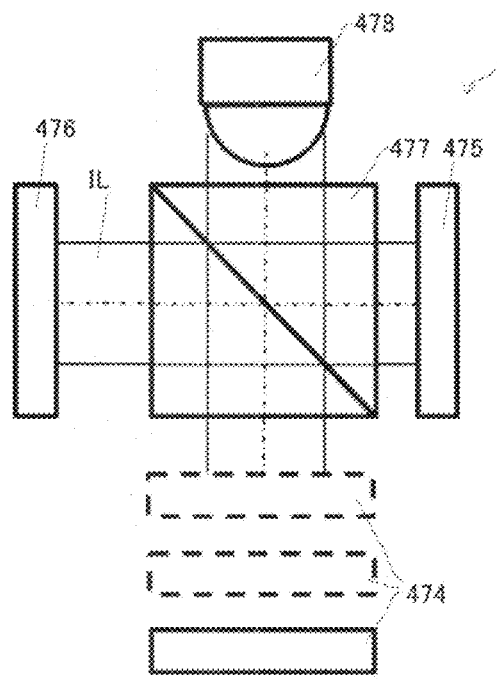
FIG. 7A is a schematic diagram illustrating arrangement of components in an interference optical system according to the fourth embodiment of the present invention.

In the fourth embodiment, as shown in FIGS. 6 and 7A, a probe main body 452 is provided with an interference optical system IF including: a light source (interference light source) 478; a reference mirror 475 for reflecting light from the light source 478; and a reference member (target mirror) 474 disposed in a moving member 462 for reflecting light from the light source 478. The interference optical system IF is capable of causing the interference of the reflected light from the reference mirror 475 and the reference member 474 to generate a plurality of interference fringes IL. The light source 478 and the reference mirror 475 are fixed to the inner side of a main body housing 458. The light source 478 and the reference member 474 disposed on an upper end 462A of the moving member 462 are aligned in the Z direction and a beam splitter 477 is disposed therebetween. The beam splitter 477 is also fixed to the inner side of the main body housing 458. These elements together constitute a Michelson interference optical system IF.

Figure 7B:
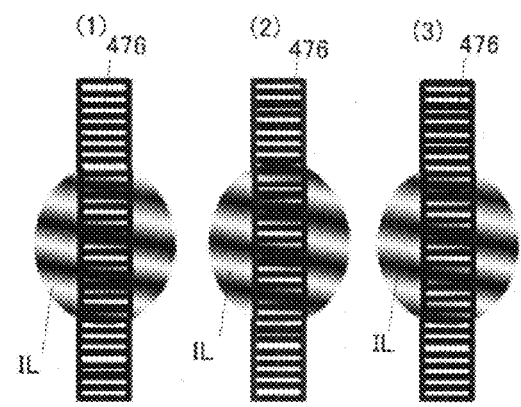
FIG. 7B shows how interfering light is incident on a displacement detector in the interference optical system according to the fourth embodiment of the present invention.

As shown in FIGS. 6 and 7A, the beam splitter 477 causes light from the light source 478 to split in a direction toward the reference mirror 475. The beam splitter 477 also guides reflected light, which is reflected by the reference member 474, to a displacement detector 476 facing the reference mirror 475 and the beam splitter 477. Simultaneously, light reflected by the reference mirror 475 and passed through the beam splitter 477 is incident on the displacement detector 476. Thus, the displacement detector 476 can detect phase shifts PS of the plurality of interference fringes IL generated by the interference optical system IF as shown in FIG. 7B.

Figure 7C:
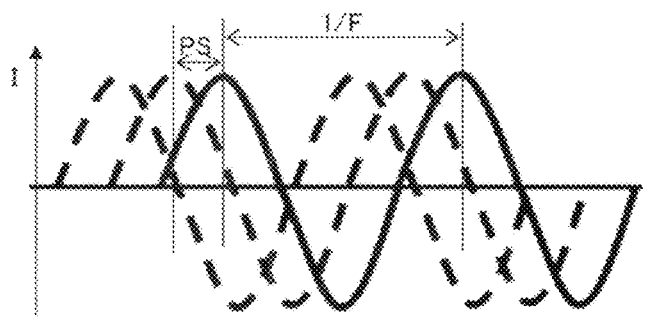
FIG. 7C is a chart showing phases and frequencies of interfering light detected by the displacement detector in the interference optical system according to the fourth embodiment of the present invention.

FIG. 7C shows light intensity I of the plurality of interference fringes IL detected by the displacement detector 476. Here, the phase shift PS reflects the amount of movement of the reference member 474 in the Z direction. Thus, an amount of displacement of the moving member 462 in the Z direction can be obtained by obtaining the phase shift PS. Here, since the plurality of interference fringes IL are constituted by interfering light and periodic, the phase shift PS can be obtained with high accuracy (it can be said also in the present embodiment that the displacement detector 476 is configured to output a relative position detection signal that allows the detection of the relative position of the moving member 462).

Thus, in the present embodiment, the displacement of the moving member 462 in the Z direction can be obtained more accurately than in the above embodiment. Also, a period 1/F of the light intensity I for the plurality of interference fringes IL reflects a tilt of the reference member 474. Thus, a slight tilt of the moving member 462 in the XY direction can be obtained by obtaining a change in the period 1/F. In the present embodiment, since the slight tilt of the moving member 462 in the XY direction, which is associated with the displacement of the moving member 462 in the Z direction, can also be obtained from the output of the displacement detector 476, the displacement of a contact part 498 in the XY direction can be obtained with higher accuracy. Note that the interference optical system IF of the present embodiment is not the only system capable of obtaining a tilt of the moving member 462 in the XY direction. In principle, the displacement detectors described in the other embodiments can also obtain such a tilt in the XY direction. Moreover, the present embodiment is based on the assumption that only one wavelength is employed. If two or more wavelengths are employed, however, the displacement detector can output an absolute position detection signal that allows the detection of the absolute position of the moving member.

In the above embodiment, when the stylus to be employed is changed, the moving member is allowed to change its position in the axial direction O according to the mass of the stylus. However, the present invention is not limited thereto. For example, the present invention may be configured as in the fifth embodiment shown in FIG. 8A. The fifth embodiment is different from the second embodiment mainly in a coupling state between a probe main body and a rotary module. Thus, for components mainly excluding those around the probe main body and the rotary module, basically the first two digits of their reference numerals are simply changed from the second embodiment and the description thereof will be omitted.

Figure 8A:
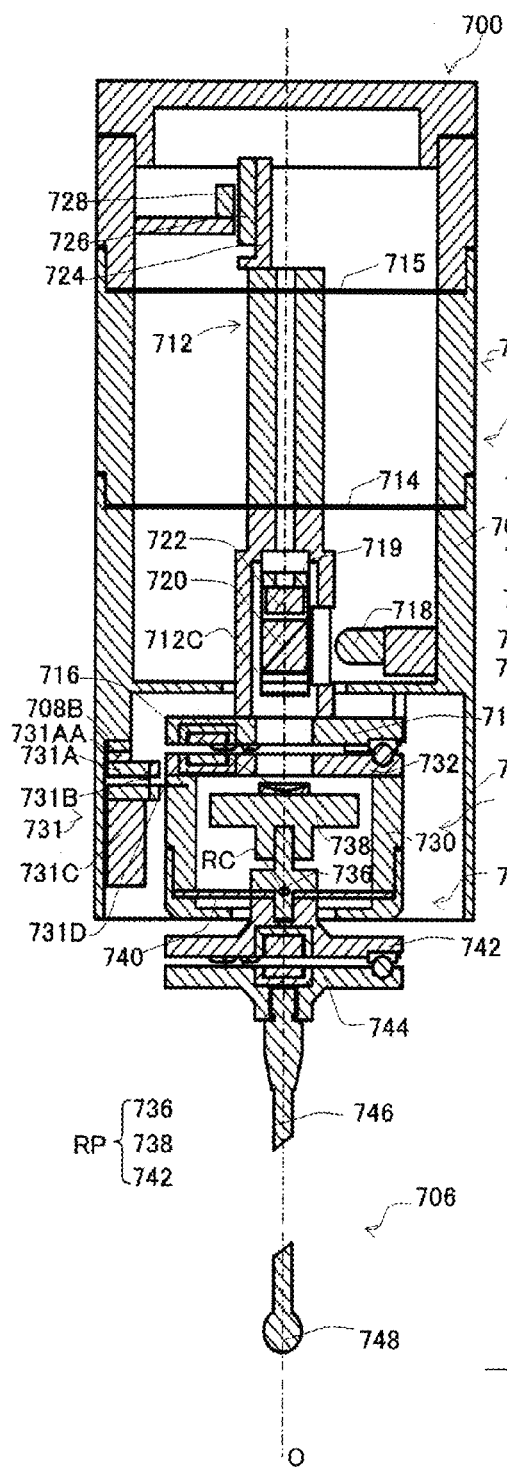
FIG. 8A is a schematic diagram illustrating a cross section of a measuring probe according to a fifth embodiment of the present invention.

In the fifth embodiment, a rotary module 704 includes: balance weights 731C corresponding to the mass of a stylus 706; and counterbalance mechanisms 731 as shown in FIG. 8A. The counterbalance mechanisms 731 are supported by a main body housing (axial element housing member) 708 and configured to keep the stylus 706 and the balance weights 731C in balance in the Z direction via a module housing (rotary element housing member) 730. The counterbalance mechanisms 731 are detachable together with the module housing 730 from the probe main body 702.

Specifically, the main body housing 708 includes a cylindrical extended portion 708A extended downwardly in the Z direction so as to cover up to a peripheral lower end of the rotary module 704 as shown in FIG. 8A. Three or more permanent magnets 708B are provided at equal intervals in the circumferential direction on the inner side of the extended portion 708A.

On the other hand, three or more counterbalance mechanisms 731 are provided in the module housing 730 so as to correspond to the positions and number of the permanent magnets 708B as shown in FIG. 8A. The counterbalance mechanism 731 includes: a supporting member 731A; a support shaft 731B; and a coupling shaft 731D. A magnetic member (which may be a magnet) 731AA attractable to the permanent magnet 708B is provided on an upper surface of the supporting member 731A. The support shaft 731B is fixed to the supporting member 731A and the balance weight 731C is eccentrically coupled to the support shaft 731B. The balance weight 731C is provided with the coupling shaft 731D in the direction perpendicular to the Z direction, and a tip of the coupling shaft 731D is coupled to the module housing 730.

Thus, in the present embodiment, a plurality of rotary modules 704 can be prepared for a single probe main body 702 and the balance weight 731C can have different mass for the different rotary modules 704. More specifically, by selecting, when the stylus 706 to be employed is changed, the rotary module 704 provided with the balance weight 731C corresponding to the mass of the stylus 706, the main body housing 708 can directly receive an increase or decrease in the mass of the stylus 706. Thus, fluctuations in the initial position of a moving member 712 in the Z direction due to different styluses 706 can be prevented by this configuration. In the present embodiment, a range of motion for the moving member 712 can be reduced when compared with the above embodiment, thus allowing further miniaturization of the probe main body 702. At the same time, the detection range (dynamic range) can also be reduced, thus allowing the detection of an amount of displacement of the moving member 712 with a higher resolution.

Figure 8B:
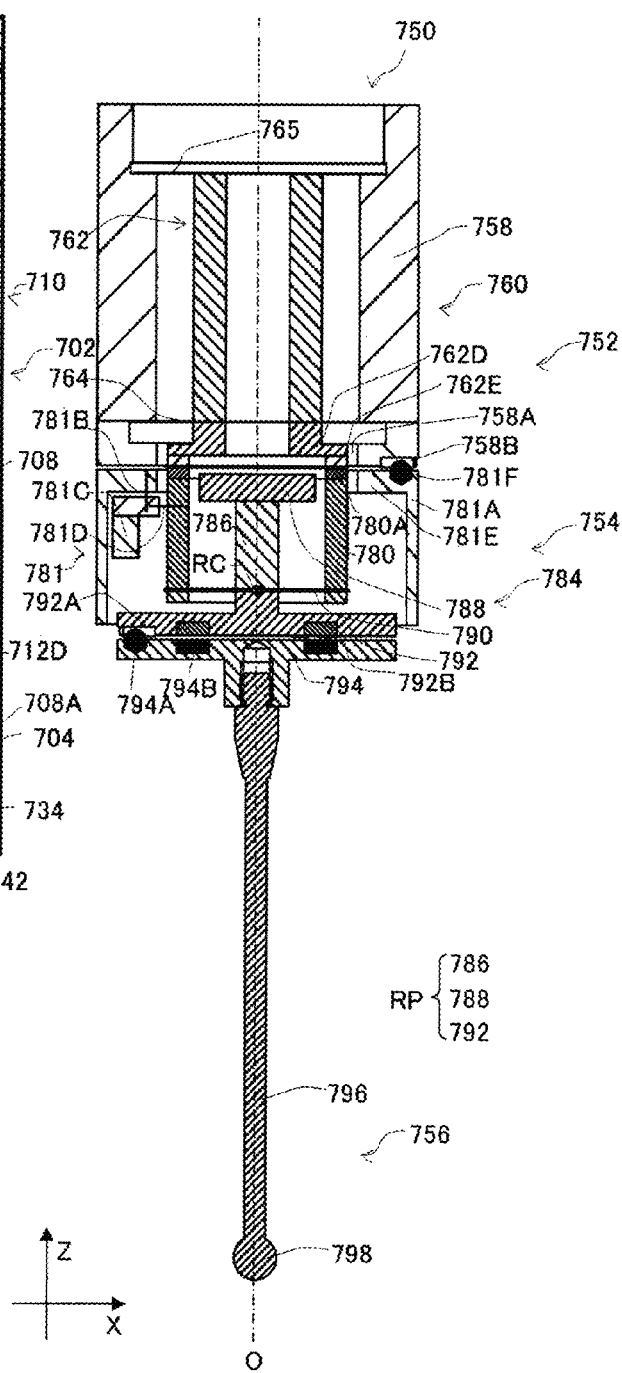
FIG. 8B is a schematic diagram illustrating a cross section of a measuring probe according to a sixth embodiment of the present invention.

FIG. 8B shows the sixth embodiment, which is a variation of the fifth embodiment. In this embodiment, a main body housing, instead of integrally including a cylindrical extended portion, has a configuration in which an annular-shaped supporting member 781A of a counterbalance mechanism 781 can be separated from a probe main body 752 as a part of a rotary module 754.

Figure 9A:
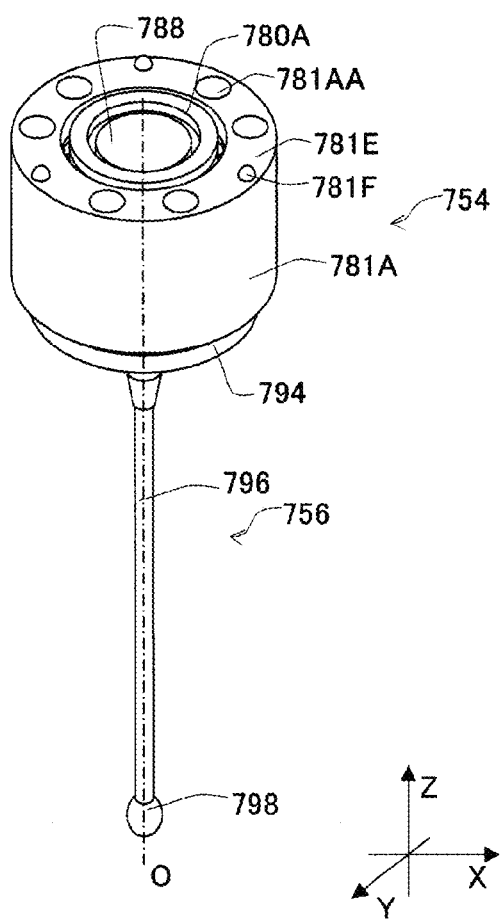
FIG. 9A is a perspective view illustrating a part of the measuring probe of FIG. 8B in which a stylus is coupled to a rotary module.
Figure 9B:
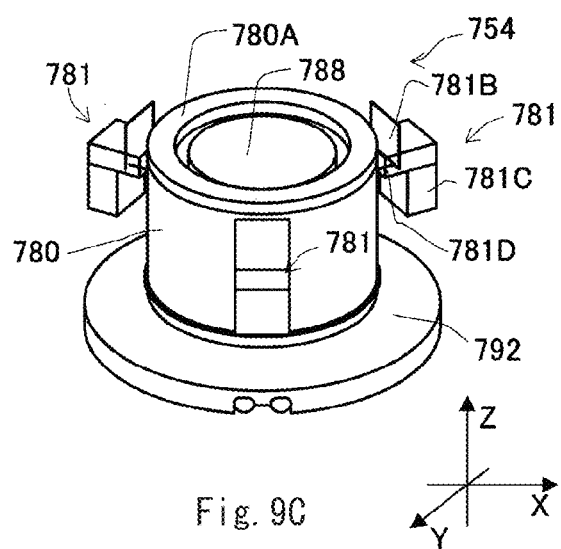
FIG. 9B is a perspective view illustrating counterbalance mechanisms in the measuring probe of FIG. 8B.

As shown in FIG. 8B, one pair of rollers 758B (engagement part) is provided along a periphery of an opening 758A of a main body housing 758 at each of positions at intervals of 120 degrees in the circumferential direction thereof, i.e., totally three pairs of rollers 758B are provided at intervals of 120 degrees in the circumferential direction thereof. An annular-shaped permanent magnet 762E is provided in a flange part 762D of a moving member 762 positioned on a radially inner side of the rollers 758B. As shown in FIGS. 8B and 9A, balls 781F corresponding to the pairs of rollers 758B are provided in a flange part 781E of the supporting member 781A (note that the flange part 781E supports a support shaft 781B). Moreover, a magnetic member 780A corresponding to the permanent magnet 762E is provided in a module housing 780 as shown in FIGS. 8B, 9A, and 9B.

Figure 9C:
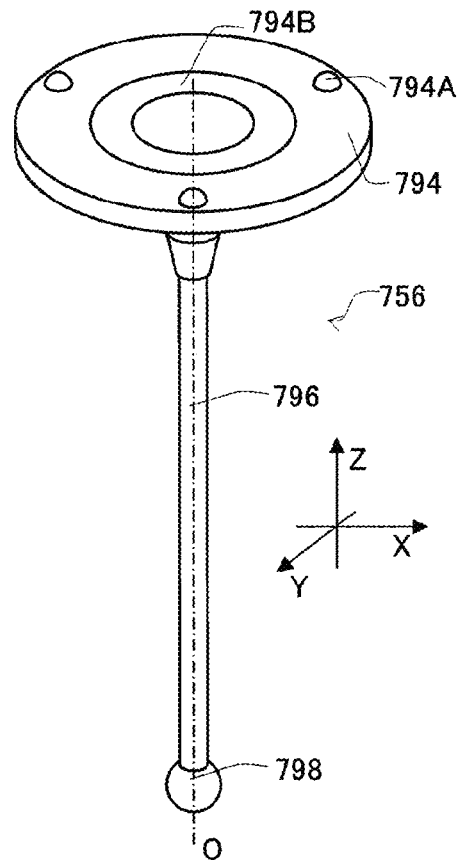
FIG. 9C is a perspective view illustrating the stylus in the measuring probe of FIG. 8B.

More specifically, unlike the fifth embodiment, in the present embodiment, a pair of rollers and a housing cover are eliminated from the flange part 762D, and the balls 781F corresponding to the pairs of rollers 758B are provided in the supporting member 781A outside the module housing 780. Thus, in the present embodiment, the weights of an axial motion mechanism 760 and a rotary motion mechanism 784 can be reduced. As shown in FIG. 9C, a magnetic member (which may be a permanent magnet) 794B corresponding to a permanent magnet 792B of a flange member 792 has a ring shape and is disposed on a radially inner side of a ball 794A of a flange part 794.

In the first embodiment, the axial motion mechanism 310 supports the module housing (rotary element housing member) 330 and the rotating member RP directly supports the stylus 306. However, the present invention is not limited thereto. For example, the present invention may be configured as in the seventh embodiment shown in FIG. 10A. The seventh embodiment is different from the above embodiments mainly in that an axial motion mechanism and a rotary motion mechanism are arranged in an opposite manner and a different type of displacement detector is used. Thus, for components excluding those associated with the arrangement of the axial motion mechanism and the rotary motion mechanism and the displacement detector, basically the first two digits of their reference numerals are simply changed from the above embodiments and the description thereof will be omitted.

Figure 10A:
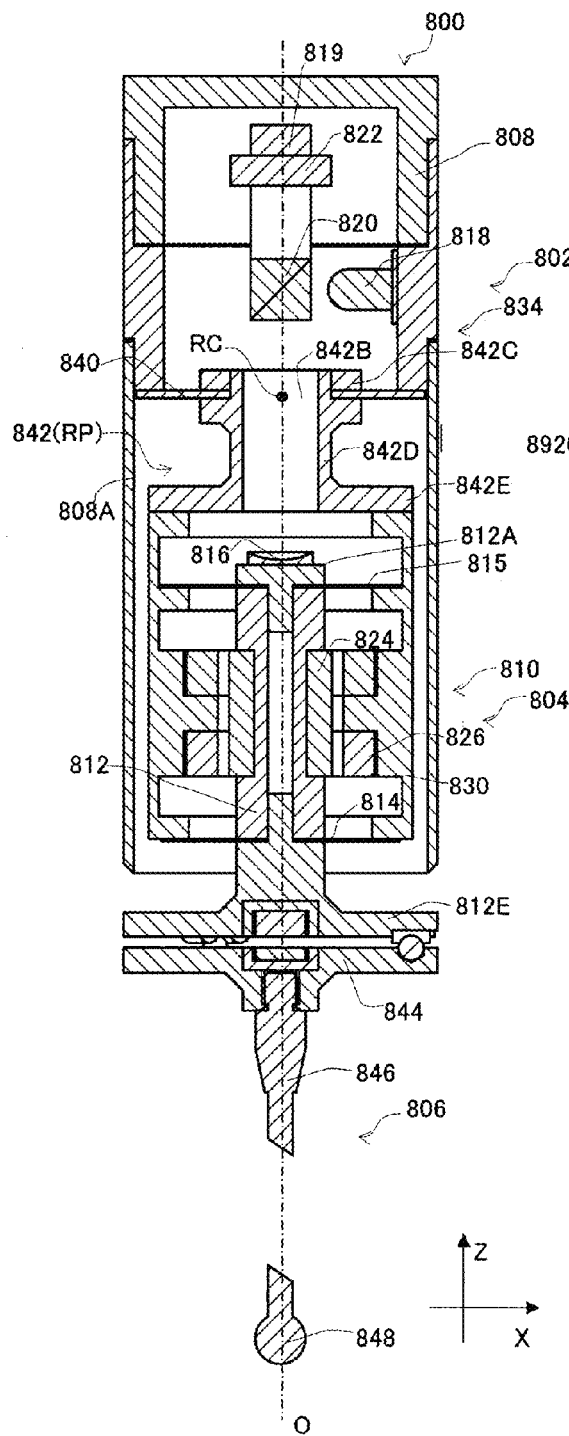
FIG. 10A is a schematic diagram illustrating a cross section of a measuring probe according to a seventh embodiment of the present invention.

In the seventh embodiment, a rotary motion mechanism 834 supports a module housing (axial element housing member) 830 and a moving member 812 directly supports a stylus 806 as shown in FIG. 10A. Here, a module including an axial motion mechanism 810 is referred to as a linear motion module 804. More specifically, a measuring probe 800 includes two modules, i.e., a probe main body 802 and the linear motion module 804, and the probe main body 802 incorporates the linear motion module 804.

As shown in FIG. 10A, the rotary motion mechanism 834 includes: a rotating member 842; and a second diaphragm structure 840 that allows the rotating member 842 to be displaced with respect to a main body housing 808.

As shown in FIG. 10A, the rotating member 842 has a generally annular shape having a hollow portion 842B around its axial center. A flange portion 842E provided at a lower end of the rotating member 842 is coupled to the cylindrical module housing 830 and constitutes the linear motion module 804.

As shown in FIG. 10A, the axial motion mechanism 810 is supported radially inside of the module housing 830. The axial motion mechanism 810 is housed in the module housing 830 except for a flange part 812E of the moving member 812. The flange part 812E is coupled to the stylus 806 without penetrating into the stylus 806. As shown in FIG. 10A, the axial motion mechanism 810 includes: the moving member 812; and a pair of first diaphragm structures 814 and 815 that allows the moving member 812 to be displaced with respect to the module housing 830.

As shown in FIG. 10A, a reference member 816, which is a reflecting mirror, is disposed on an upper end 812A of the moving member 812. Light passed through the hollow portion 842B of the rotating member 842 is reflected by the reference member 816. Also, a displacement detector 826 for detecting displacement of the moving member 812 is disposed inside the module housing 830 so as to face the moving member 812 (i.e., the displacement detector 826 is incorporated in the linear motion module 804). Here, the displacement detector 826 constitutes a differential transformer transducer. Specifically, a reference member 824 provided along the periphery of the moving member 812 is a cylindrical metal member. The displacement detector 826 has a cylindrical shape and is disposed so as to be in proximity to and face the periphery of the reference member 824. The displacement detector 826 is configured by: an exciting coil that oscillates at a high frequency (e.g., a sinusoidal voltage of 1 kHz or greater is used); and a set of differential-coupled receiving coils disposed so as to interpose the exciting coil therebetween. The receiving coils can detect unidirectional displacement (absolute position) of the reference member 824 with respect to the module housing 830. More specifically, the displacement detector 826 is configured to output an absolute position detection signal that allows the detection of the absolute position of the moving member 812.

As described above, in the present embodiment, the rotary motion mechanism 834 supports the module housing 830 and the moving member 812 directly supports the stylus 806. Thus, the detection sensitivity by the axial motion mechanism 810, positioned closer to the stylus 806, can be improved. Additionally, since the weight of the axial motion mechanism 810 can be reduced, the responsivity of the axial motion mechanism 810 can be increased. Moreover, since the differential transformer transducer is employed to detect the unidirectional displacement (absolute position) with respect to the module housing 830, the absolute position of a contact part 848 in the axial direction O can be easily calculated.

Figure 10B:
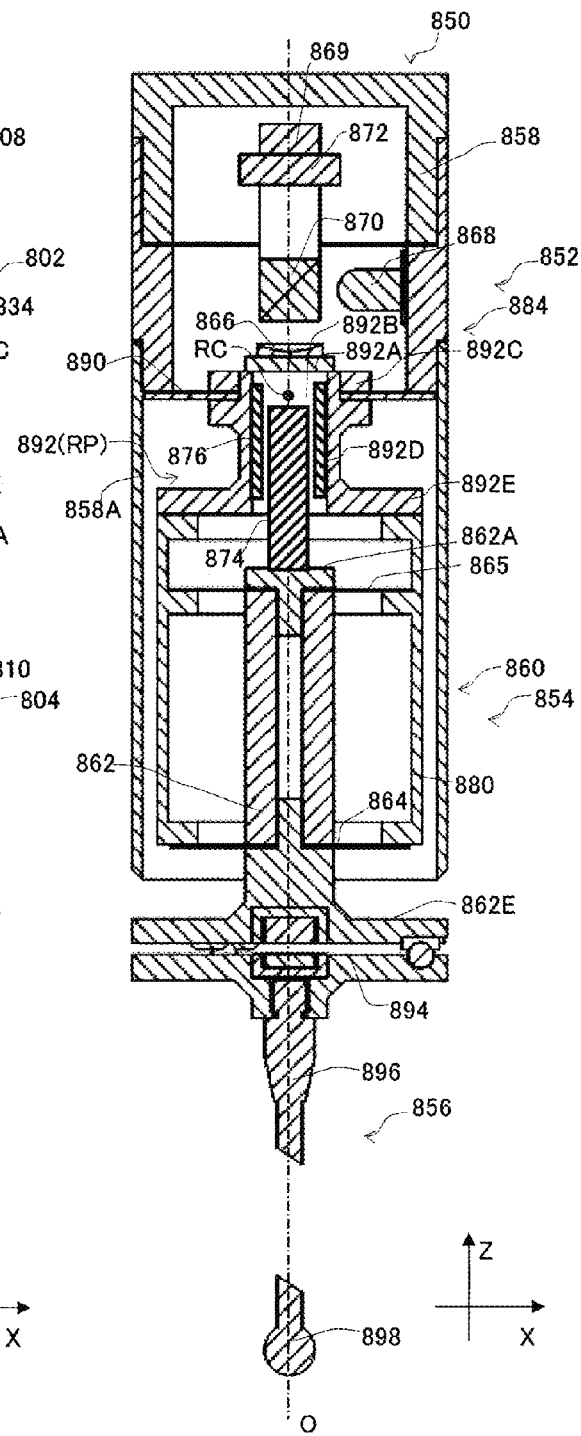
FIG. 10B is a schematic diagram illustrating a cross section of a measuring probe according to an eighth embodiment of the present invention.

FIG. 10B shows the eighth embodiment, which is a variation of the seventh embodiment. Here, a reference member 874, which constitutes a differential transformer transducer, is provided on an upper end 862A of a moving member 862, and a displacement detector 876 is provided on an inner side surface of a hollow portion 892B of a rotating member 892. A reference member 866 is disposed on an upper end 892A of the rotating member 892. The other elements are similar to those in the seventh embodiment and the description thereof is therefore omitted.

Although the linear motion module is incorporated in the probe main body in the seventh and eighth embodiments, the present invention is not limited thereto. For example, the present invention may be configured as in the ninth embodiment shown in FIG. 11A. The ninth embodiment is different from the seventh embodiment mainly in a coupling state between a probe main body and a linear motion module. Furthermore, this coupling state is approximately the same as that in the third embodiment. Thus, for components excluding those different from the third and seventh embodiments, basically the first two digits of their reference numerals are simply changed from the third and seventh embodiments and the description thereof will be omitted.

Figure 11A:
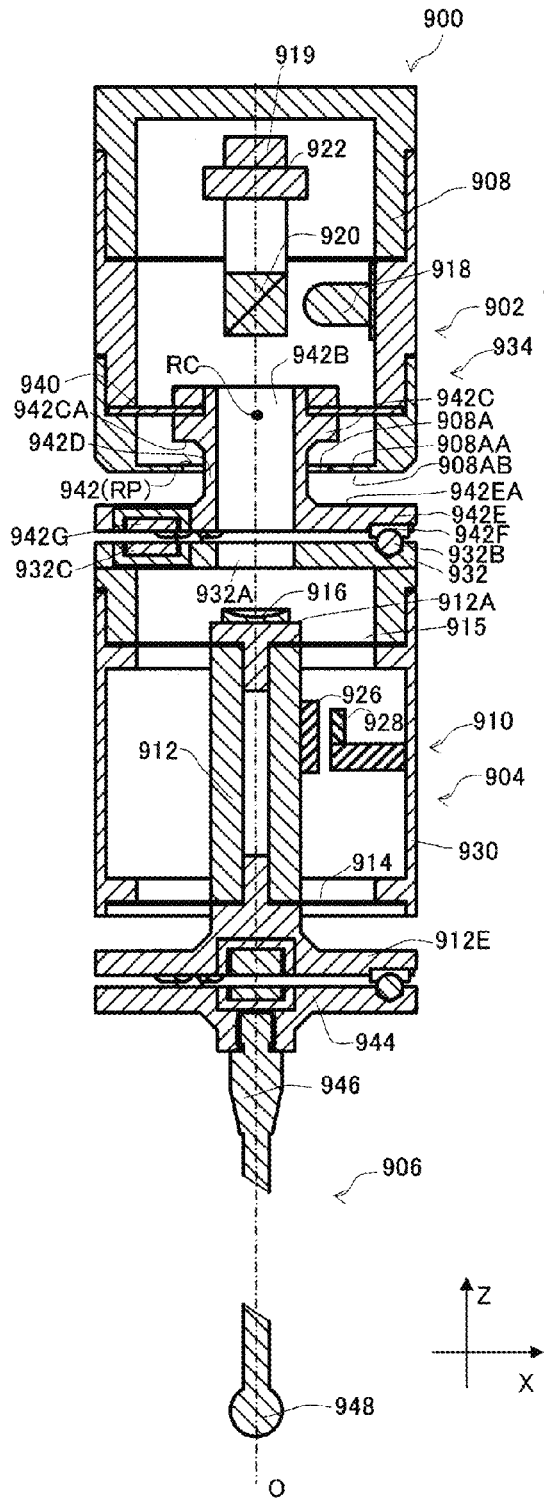
FIG. 11A is a schematic diagram illustrating a cross section of a measuring probe according to a ninth embodiment of the present invention.

In the ninth embodiment, a linear motion module 904 is not incorporated in a probe main body 902 as shown in FIG. 11A. The linear motion module 904 is detachably coupled to the probe main body 902 with rollers 942F and balls 932B (engagement part) capable of positioning to each other. Note that the linear motion module 904, which can be separated from the probe main body 902, is hereinafter referred to also as a probe module. A displacement detector 928 is supported by a module housing 930 that supports a moving member 912. The displacement detector 928 constitutes the photoelectric incremental linear encoder shown in the second embodiment (which may be a photoelectric, magnetic, or electromagnetic induction absolute linear encoder, for example) together with a reference member 926 provided on a side surface of the moving member 912.

Note that a plurality of styluses 906 (having contact parts 948 of different materials, at different positions, or with different mass, for example) are prepared. Corresponding to the styluses 906, a plurality of linear motion modules 904 (the number thereof may not necessarily be the same as the number of the styluses 906) can be prepared for the single probe main body 902.

As shown in FIG. 11A, the probe main body 902 includes: a main body housing 908; an orientation detector 922; and a rotary motion mechanism 934. The rotary motion mechanism 934 is supported radially inside of the main body housing 908. The rotary motion mechanism 934 is housed in the main body housing 908 except for a flange portion 942E of a rotating member 942. The rotary motion mechanism 934 includes: the rotating member 942; and a second diaphragm structure 940 that allows the rotating member 942 to be displaced with respect to the main body housing 908.

As shown in FIG. 11A, the rotating member 942 has a generally cylindrical shape having a hollow portion 942B around its axial center. More specifically, the rotating member 942 integrally includes: a thick portion 942C; a thin portion 942D; and the flange portion 942E from the upper part toward the lower part thereof in the Z direction. The second diaphragm structure 940 is coupled to the thick portion 942C. The thin portion 942D is formed below the thick portion 942C. Note that a diameter of an opening 908A of the main body housing 908 is set to be smaller than an outer diameter of the thick portion 942C. An outer diameter of the flange portion 942E is set to be larger than the diameter of the opening 908A. Here, a distance between a lower end 942CA of the thick portion 942C and an upper end 908AA of the opening 908A and a distance between an upper end 942EA of the flange portion 942E and a lower end 908AB of the opening 908A may be determined to regulate displacement of the rotating member 942 so that an amount of deformation in the second diaphragm structure 940 falls within the range of elastic deformation. Alternatively, a distance between an outer side surface of the thin portion 942D and an inner end face of the opening 908A may be determined to regulate displacement of the rotating member 942 so that an amount of deformation in the second diaphragm structure 940 falls within the range of elastic deformation (in this case, it can be said that the probe main body 902 includes the main body housing 908 and the rotating member 942 together serving as a second limiting member for limiting an amount of deformation in the second diaphragm structure 940 within the range of elastic deformation). Note that the flange portion 942E is coupled to the linear motion module 904 without penetrating into the linear motion module 904.

As shown in FIG. 11A, along a periphery on a lower end of the flange portion 942E, one pair of rollers 942F is provided at each of positions at intervals of 120 degrees in the circumferential direction thereof, i.e., totally three pairs of rollers 942F are provided at intervals of 120 degrees in the circumferential direction thereof. Three permanent magnets 942G are provided so as to be out of phase with the rollers 942F by 60 degrees in the circumferential direction. Note that the axial direction of the pair of rollers 942F coincides with an approximately radial direction toward the center of the flange portion 942E.

As shown in FIG. 11A, the linear motion module 904 includes: a module cover 932; the module housing 930; and an axial motion mechanism 910. Note that according to the present embodiment, the module cover 932 and the module housing 930 together constitute an axial element housing member.

As shown in FIG. 11A, the module cover 932 has a flange shape with an opening 932A at its center. The module cover 932 is a member corresponding to the flange portion 942E. More specifically, three balls 932B are disposed so as to be each in contact with both of the pair of rollers 942F at intervals of 120 degrees in the circumferential direction of the module cover 932. Corresponding to the permanent magnets 942G, magnetic members (which may be permanent magnets) 932C attracted to the permanent magnets 942G are disposed so as to be out of phase with the balls 932B by 60 degrees.

In other words, the module cover 932 and the flange portion 942E are coupled to each other with a detachable kinematic joint. As described above, in the present embodiment the rotary motion mechanism 934 is incorporated in the probe main body 902 and the axial motion mechanism 910 is incorporated only in the linear motion module 904. Suppose a case where at least the axial motion mechanism 910 should be changed from the perspective of its performance when the stylus 906 is changed, for example. In such a case, simply by replacing the linear motion module 904 without changing the probe main body 902, the rectilinear movement property of the moving member 912 in the axial motion mechanism 910 can be improved (i.e., the occurrence of displacement of the moving member 912 shifted from one direction with respect to the module housing 930 can be reduced), for example, by increasing a distance between a pair of first diaphragm structures 914 and 915. Conversely, replacing the probe main body 902 with respect to the same linear motion module 904 can be easily achieved. Moreover, when only the axial motion mechanism 910 is broken or degraded in its performance, the function of a measuring probe 900 can be maintained simply by replacing the linear motion module 904.

In the present embodiment, the probe main body 902 and the linear motion module 904 are detachably coupled to each other with the rollers 942F and the balls 932B capable of positioning to each other. This allows the coupling positions to be reproduced with high accuracy even when attachment and detachment of the linear motion module 904 are repeatedly performed. Moreover, by providing the balls 932B at the same positions in the plurality of linear motion modules 904, the plurality of linear motion modules 904 can be easily attached to or detached from the probe main body 902 and a high degree of positional reproducibility can be achieved.

In the present embodiment, the plurality of linear motion modules 904 may be prepared for the single probe main body 902, and a different restoring force per unit displacement when the axial motion mechanism 910 is displaced may be set for each of the plurality of linear motion modules 904. Thus, a restoring force individually corresponding to the styluses 906 or objects W to be measured can be set, unidirectional displacement with respect to the module housing 930 can be detected with high sensitivity, and the detection range can be expanded easily. Also, damage to the object W to be measured can be lessened.

Although the orientation detector 922 is housed in the main body housing 908 that supports both the moving member 912 and the rotating member 942 in the ninth embodiment, the present invention is not limited thereto. For example, the present invention may be configured as in the tenth embodiment shown in FIG. 11B. The tenth embodiment has a configuration in which the probe main body 902 in the ninth embodiment can be separated between a beam splitter 920 and the rotating member 942 in the axial direction O. In other words, the tenth embodiment is different from the ninth embodiment mainly in the position of an orientation detector. Thus, for components mainly excluding those associated with the position of the orientation detector, basically the first two digits of their reference numerals are simply changed from the ninth embodiment and the description thereof will be omitted.

Figure 11B:
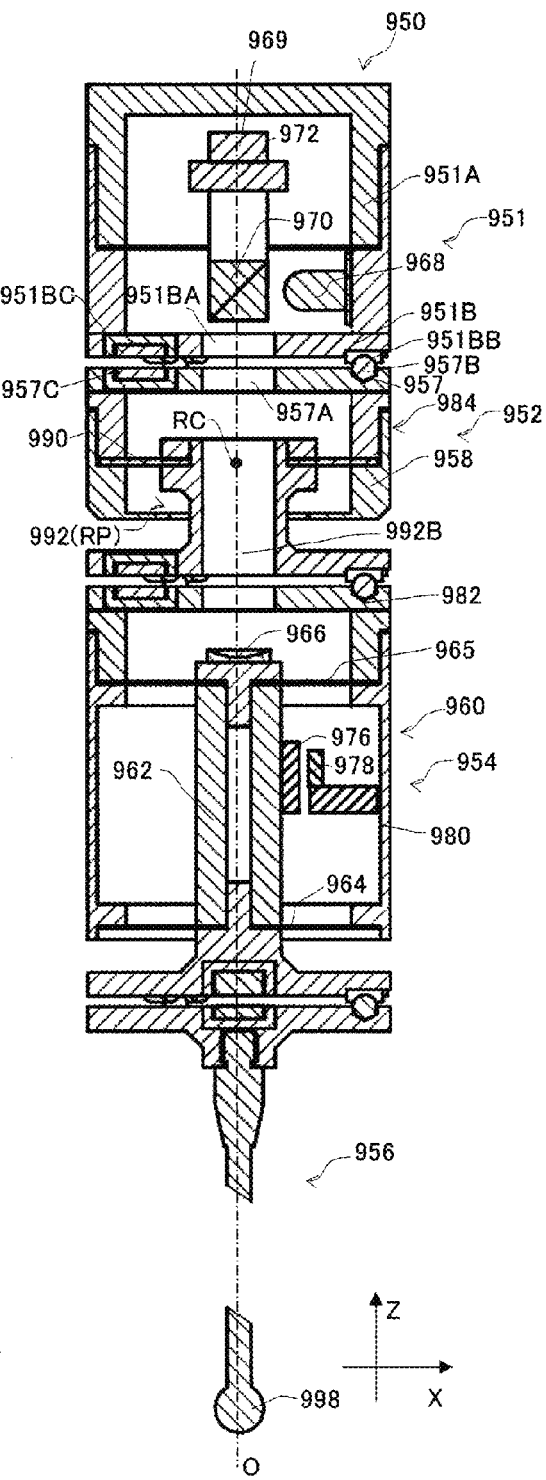
FIG. 11B is a schematic diagram illustrating a cross section of a measuring probe according to a tenth embodiment of the present invention.

In the tenth embodiment, there is provided, as shown in FIG. 11B, a preceding module 951, which detachably couples and supports a main body housing 958 that supports both of a moving member 962 and a rotating member 992 with rollers 951BB and balls 957B (engagement part) capable of positioning the main body housing 958. An orientation detector 972 is incorporated in the preceding module 951.

Specifically, the preceding module 951 includes: a preceding housing (preceding housing member) 951A; a light source 968; a beam splitter 970; and the orientation detector 972 as shown in FIG. 11B. The preceding housing 951A supports the light source 968, the beam splitter 970, and the orientation detector 972 radially inside thereof. The preceding housing 951A is provided with a lower cover 951B at a lower end thereof. The lower cover 951B has a flange shape with an opening 951BA at its center. Along a periphery on a lower end of the lower cover 951B, one pair of rollers 951BB is provided at each of positions at intervals of 120 degrees in the circumferential direction thereof, i.e., totally three pairs of rollers 951BB are provided at intervals of 120 degrees in the circumferential direction thereof as shown in FIG. 11B. Three permanent magnets 951BC are provided so as to be out of phase with the rollers 951BB by 60 degrees in the circumferential direction. In other words, the preceding housing 951A detachably couples and supports the main body housing 958 with the rollers 951BB and the balls 957B capable of positioning the main body housing 958. The preceding housing 951A houses the orientation detector 972.

As shown in FIG. 11B, a probe main body 952 includes: an upper cover 957; the main body housing 958; and a rotary motion mechanism 984. As shown in FIG. 11B, the upper cover 957 has a flange shape with an opening 957A at its center. The upper cover 957 is a member corresponding to the lower cover 951B (the opening 957A thus ensures the provision of an optical path for incident light to a reference member 966 and reflected light from the reference member 966). Moreover, three balls 957B are disposed at intervals of 120 degrees in the circumferential direction of the upper cover 957 so as to be each in contact with both of the pair of rollers 951BB. A magnetic member (which may be a permanent magnet) 957C is disposed so as to correspond to the permanent magnet 951BC. In other words, the lower cover 951B and the upper cover 957 are coupled to each other with a detachable kinematic joint.

As described above, in the present embodiment, only the rotary motion mechanism 984 is incorporated in the probe main body 952, and the light source 968, the beam splitter 970, and the orientation detector 972 are incorporated in the preceding module 951. Thus, only the rotary motion mechanism 984 can be changed easily and the preceding module 951 can also be changed easily. In other words, change in performance or replacement of the rotary motion mechanism 984 and that of the orientation detector 972 can be independently performed and the cost thereof can be reduced. Moreover, this enables, by directly attaching a linear motion module 954 to the preceding module 951 without attaching the probe main body 952 thereto, the testing for the rectilinear movement property of the linear motion module 954 with the use of an output of the orientation detector 972, for example. Although the linear motion module 954 supports a stylus 956 in the present embodiment, the preceding module may be provided while the rotary module supports the stylus as in the third embodiment.

Figure 12A:
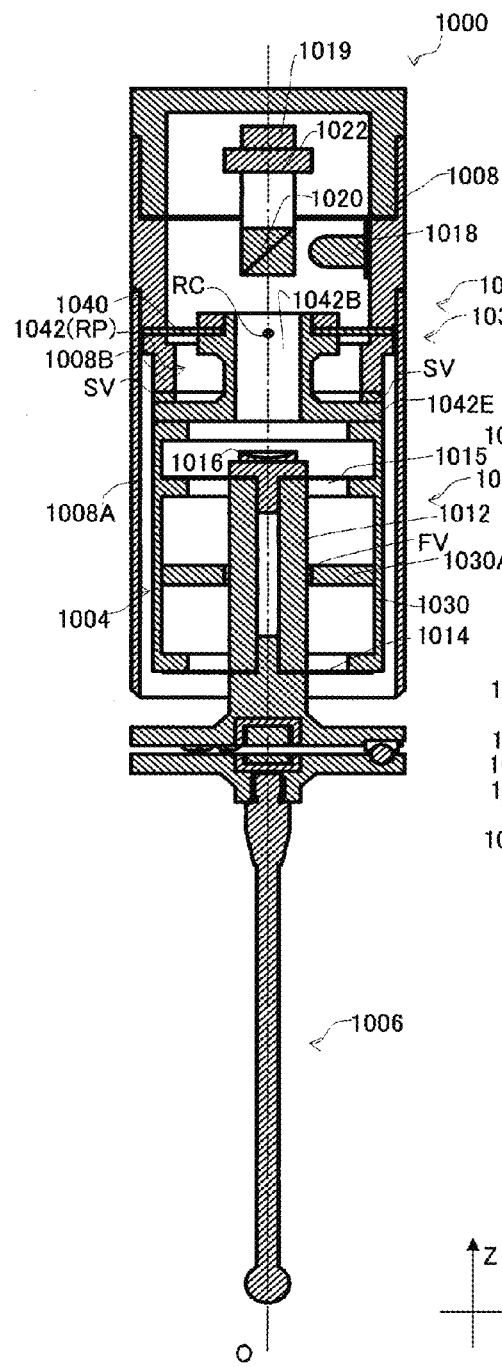
FIG. 12A is a schematic diagram illustrating a cross section of a measuring probe according to an eleventh embodiment of the present invention.

In the seventh embodiment, a distance between an inner side surface of an extended portion 808A and an outer side surface of the module housing 830 is determined to regulate displacement of the rotating member 842 so that an amount of deformation in the second diaphragm structure 840 falls within the range of elastic deformation. In other words, it can be said that the probe main body 802 includes the main body housing 808 and the module housing 830 together serving as a second limiting member for limiting an amount of deformation in the second diaphragm structure 840 within the range of elastic deformation. By contrast to this, the present invention may be configured as in the eleventh embodiment shown in FIG. 12A, for example. The eleventh embodiment is different from the seventh embodiment mainly in the shapes of a main body housing and a module housing. Thus, for components mainly excluding those associated with the relationship between the main body housing and a rotating member and the relationship between a moving member and the module housing, basically the first two digits of their reference numerals are simply changed from the seventh embodiment and the description thereof will be omitted. In FIG. 12A, a displacement detector (not shown) is disposed (fixed) radially inside of a module housing 1030 similarly to the seventh embodiment while avoiding the contact with an inner wall portion 1030A.

In the eleventh embodiment, a ring portion 1008B is provided in a main body housing 1008 so as to face an upper end of a flange portion 1042E of a rotating member 1042 as shown in FIG. 12A. In other words, it can be said that the ring portion 1008B is a second wall member disposed integrally with the main body housing 1008. At least part of a gap between (a lower end of) the ring portion 1008B and (an upper end of) the flange portion 1042E is filled with a second viscous material SV, such as a grease oil. The "filling" as used herein refers to filling performed by disposing the second viscous material SV without leaving any space at least in one place in the XY direction between the ring portion 1008B and the rotating member 1042 (axisymmetric filling is not necessarily required). Consequently, at least the second viscous material SV can damp the displacement of the rotating member 1042 with respect to the ring portion 1008B, reduce vibration in the XY direction caused by the movement of a measuring probe 1000, for example, and prevent an increase in noise associated with an increase in the sensitivity of the measuring probe 1000.

Also, the inner wall portion 1030A is provided in the module housing 1030 so as to face an outer side surface of a moving member 1012 as shown in FIG. 12A. In other words, it can be said that the inner wall portion 1030A is a first wall member disposed so as to face the moving member 1012 and to be integral with the module housing 1030. At least part of a gap between (an inner side surface of) the inner wall portion 1030A and (the outer side surface of) the moving member 1012 is filled with a first viscous material FV, such as a grease oil. The "filling" as used herein refers to filling performed by disposing the first viscous material FV without leaving any space at least in one place in the Z direction between the inner wall portion 1030A and the moving member 1012 (axisymmetric filling is not necessarily required). Consequently, at least the first viscous material FV can damp the displacement of the moving member 1012 with respect to the inner wall portion 1030A, reduce vibration in the Z direction caused by the movement of the measuring probe 1000, for example, and prevent an increase in noise associated with an increase in the sensitivity of the measuring probe 1000. Thus, the first viscous material FV and the second viscous material SV can prevent an increase in noise even when the measuring probe 1000 is moved at a high speed.

Furthermore, in the present embodiment, since damping structures in the Z direction and the XY direction are separately provided, the first viscous material FV and the second viscous material SV can be individually changed. Thus, damping characteristics in the Z direction and the XY direction can be individually optimized.

Figure 12B:
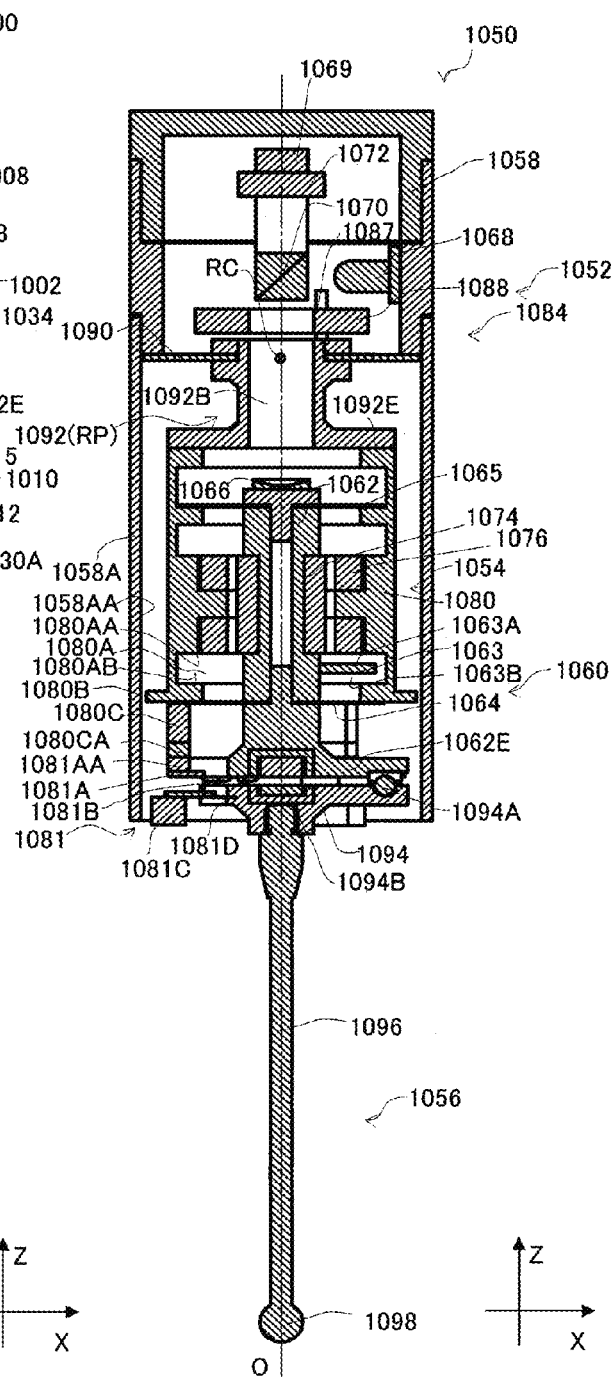
FIG. 12B is a schematic diagram illustrating a cross section of a measuring probe according to a twelfth embodiment of the present invention.

Unlike the seventh embodiment, the present invention may be configured as in the twelfth embodiment shown in FIG. 12B, for example. The twelfth embodiment is different from the seventh embodiment mainly in the addition of a balancing member and the counterbalance mechanisms described in the fifth and sixth embodiments. Thus, for components mainly excluding those associated with the configuration of the balancing member and the counterbalance mechanisms, basically the first two digits of their reference numerals are simply changed from the seventh embodiment and the description thereof will be omitted.

In the twelfth embodiment, a rotating member 1092 includes an annular-shaped balancing member 1088 on the side opposite to a stylus 1056 with respect to the rotation center RC of a rotary motion mechanism 1084 as shown in FIG. 12B. The balancing member 1088 is supported by a supporting part 1087 provided on an upper end of the rotating member 1092. The balancing member 1088 can move in engagement with the supporting part 1087. The supporting part 1087 allows the adjustment of a distance between the rotation center RC and the balancing member 1088. Thus, by changing the distance between the balancing member 1088 and the rotation center RC, the center of gravity of the rotating members 1092 (member supported by a second diaphragm structure 1090) to which different styluses 1056 are coupled can be made coincident with the rotation center RC. Thus, higher sensitivity of a measuring probe 1050 can be achieved in the present embodiment than in the above embodiment. Note that such a balancing member capable of adjusting its position may be applied to the structure, as shown in the eleventh embodiment, in which the axial motion mechanism supports the rotary motion mechanism.

As shown in FIG. 12B, supporting parts 1080C are provided below a first diaphragm structure 1064 supported by a module housing 1080 at intervals of 120 degrees in the circumferential direction. A permanent magnet 1080CA is disposed on a tip of the supporting part 1080C.

As shown in FIG. 12B, the stylus 1056 supported by a flange part 1062E of a moving member 1062 includes: balance weights 1081C corresponding to the mass of the stylus 1056; and counterbalance mechanisms 1081. As with the fifth and sixth embodiments, the counterbalance mechanisms 1081 are supported by the module housing (axial element housing member) 1080 (via the supporting parts 1080C) and configured to keep the stylus 1056 and the balance weights 1081C in balance in the Z direction. The counterbalance mechanisms 1081 are detachable together with the stylus 1056 from the probe main body 1052.

Figure 13A:
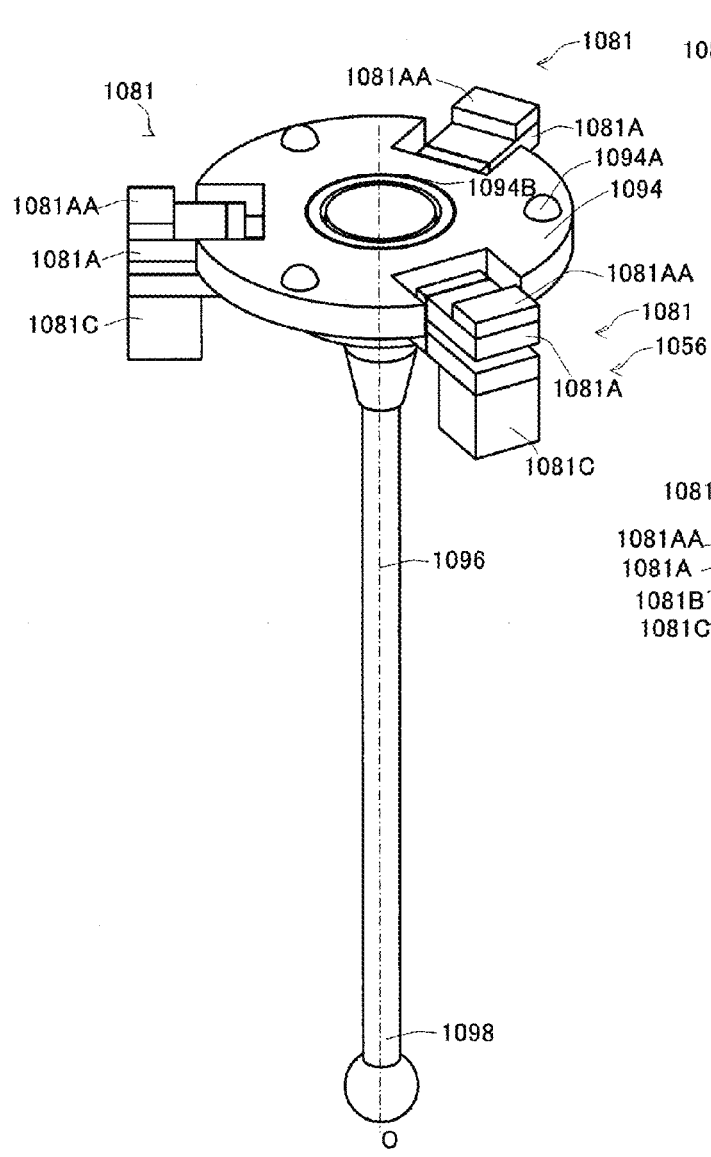
FIG. 13A is a schematic perspective view illustrating a stylus and counterbalance mechanisms according to the twelfth embodiment of the present invention.
Figure 13B:
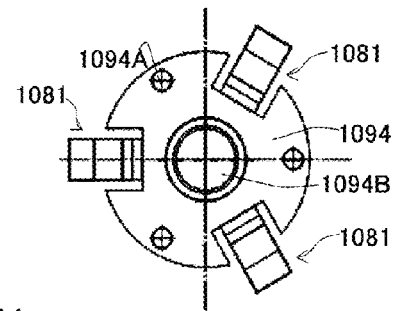
FIG. 13B is a schematic upper view illustrating the stylus and the counterbalance mechanisms according to the twelfth embodiment of the present invention.
Figure 13C:
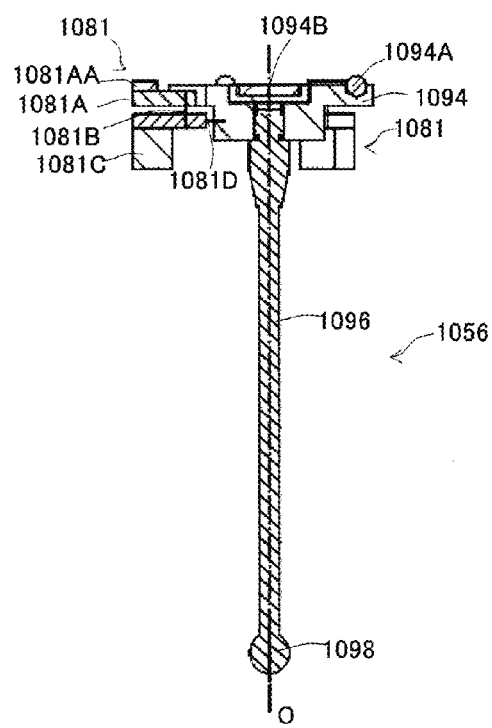
FIG. 13C is a schematic cross-sectional view illustrating the stylus and the counterbalance mechanisms according to the twelfth embodiment of the present invention.

As shown in FIGS. 13A to 13C, three or more counterbalance mechanisms 1081 are provided in the stylus 1056 so as to correspond to the positions and number of the permanent magnets 1080CA. The counterbalance mechanism 1081 includes: a supporting member 1081A; a support shaft 1081B; and a coupling shaft 1081D. A magnetic member (which may be a magnet) 1081AA attractable to the permanent magnet 1080CA is provided on an upper surface of the supporting member 1081A. The support shaft 1081B is fixed to the supporting member 1081A and the balance weight 1081C is eccentrically coupled to the support shaft 1081B. The balance weight 1081C is provided with the coupling shaft 1081D in the direction perpendicular to the Z direction, and a tip of the coupling shaft 1081D is coupled to a flange part 1094 of the stylus 1056.

Thus, when the stylus 1056 is replaced for a single probe main body 1052, the balance weights 1081C corresponding to the mass of the changed stylus 1056 are necessarily used. This allows the module housing 1080 to directly receive an increase or decrease in the mass of the stylus 1056. More specifically, fluctuations in the initial position of the moving member 1062 in the Z direction due to different styluses 1056 can be prevented by this configuration. In other words, in the present embodiment, a range of motion for the moving member 1062 can be reduced when compared with the seventh embodiment, thus allowing further miniaturization of a linear motion module 1054. At the same time, the detection range can be reduced, thus allowing the detection of an amount of displacement of the moving member 1062 with a higher resolution.

In the present embodiment, a protruding portion 1080B is further provided on an outer side surface of the module housing 1080. More specifically, a distance between an inner side surface 1058AA of an extended portion 1058A and the protruding portion 1080B of the module housing 1080 is determined to regulate displacement of the rotating member 1092 so that an amount of deformation in the second diaphragm structure 1090 falls within the range of elastic deformation. In other words, it can be said that the probe main body 1052 includes a main body housing 1058 and the module housing 1080 together serving as a second limiting member for limiting an amount of deformation in the second diaphragm structure 1090 within the range of elastic deformation.

Also, in the present embodiment, a depressed portion 1080A is provided on an inner side surface of the module housing 1080. A rod-shaped restraining member 1063 is fixed to the moving member 1062 and the restraining member 1063 is disposed inside the depressed portion 1080A while not being in contact therewith. More specifically, a distance between an upper end 1080AA of the depressed portion 1080A and an upper end 1063A of the restraining member 1063 and a distance between a lower end 1080AB of the depressed portion 1080A and a lower end 1063B of the restraining member 1063 are determined to regulate displacement of the moving member 1062 so that an amount of deformation in a pair of first diaphragm structures 1064 and 1065 falls within the range of elastic deformation. In other words, it can be said that the linear motion module 1054 includes the module housing 1080 and the restraining member 1063 together serving as a first limiting member for limiting an amount of deformation in the pair of first diaphragm structures 1064 and 1065 within the range of elastic deformation.

Although the pair of first diaphragm structures and the second diaphragm structure are sequentially disposed in the axial direction O in the above embodiment, the present invention is not limited thereto. For example, the present invention may be configured as in the thirteenth embodiment shown in FIG. 14A. The thirteenth embodiment is different from the above embodiment mainly in arrangement between a pair of first diaphragm structures and a second diaphragm structure. Thus, for components mainly excluding those associated with the arrangement between the pair of first diaphragm structures and the second diaphragm structure, basically the first two digits of their reference numerals are simply changed from the above embodiment and the description thereof will be omitted.

In the thirteenth embodiment, a second diaphragm structure 1140 is disposed between a pair of first diaphragm structures 1114 and 1115 in the axial direction O as shown in FIG. 14A. A rotary motion mechanism 1134 supports a rotating member (axial element housing member) 1136 inside a probe main body 1102. The moving member 1112 directly supports a stylus 1106.

As shown in FIG. 14A, the rotating member 1136 of the rotary motion mechanism 1134 is a member supported by the second diaphragm structure 1140. Except for a supporting part 1136AA, the rotating member 1136 has a generally hourglass shape symmetric about the second diaphragm structure 1140 in the axial direction O. The rotating member 1136 integrally includes: two ring portions 1136A; two connecting portions 1136B; two cylindrical portions 1136C; and two joining portions 1136D. The ring portion 1136A has a ring shape. Peripheral portions of the first diaphragm structures 1114 and 1115 are fixed to the ring portions 1136A. The connecting portions 1136B extend toward radially inside of the ring portions 1136A so as to face the first diaphragm structures 1114 and 1115. Each of the cylindrical portions 1136C has a hollow around its axial center. The cylindrical portions 1136C are provided integrally with the connecting portions 1136B. The two joining portions 1136D are coupled to each other with the second diaphragm structure 1140 interposed therebetween. More specifically, the pair of first diaphragm structures 1114 and 1115 are disposed at a symmetric distance with respect to the second diaphragm structure 1140 in the axial direction O (note that a completely symmetric distance is not required but design or manufacturing errors, for example, are tolerated). Thus, the rotation center of the moving member 1112, generated by the pair of first diaphragm structures 1114 and 1115, can be made coincident with the rotation center RC of the rotary motion mechanism 1134. The supporting part 1136AA extends from a part of the ring portion 1136A in an area external to the axial direction O and supports a displacement detector 1126.

Note that the character Lh denotes a distance between the first diaphragm structures 1114 and 1115 supported by the rotating member 1136 as shown in FIG. 14A. The character Lw denotes a diameter of the inner peripheral surface of the ring portions 1136A to which the first diaphragm structures 1114 and 1115 are fixed. In the present embodiment, the distance Lh is set to be greater than twice the diameter Lw (Lh>2*Lw). Thus, in an amount of displacement of the moving member 1112 by the first diaphragm structures 1114 and 1115, a percentage of a movement component on a central axis of the rotating member 1136 can be made greater than that of a rotation component with respect to the central axis of the rotating member 1136. Thus, in the present embodiment, the unidirectional displacement accuracy of the moving member 1112 can be enhanced (high rectilinear movement accuracy can be ensured) (the distance Lh is not limited thereto, but may be smaller than or equal to twice the diameter Lw). Note that such a relationship can be applied to all of the embodiments.

As shown in FIG. 14A, a distance between an outer side surface of the ring portion 1136A and an inner side surface of a main body housing (rotary element housing member) 1108 is determined to regulate a tilt (displacement) of the rotating member 1136 so that an amount of deformation in the second diaphragm structure 1140 falls within the range of elastic deformation. In other words, it can be said that the probe main body 1102 includes the main body housing 1108 and the rotating member 1136 together serving as a second limiting member for limiting an amount of deformation in the second diaphragm structure 1140 within the range of elastic deformation.

As shown in FIG. 14A, an axial motion mechanism 1110 is supported radially inside of the rotating member 1136. More specifically, the rotating member 1136 and the axial motion mechanism 1110 together constitute a linear motion module 1104.

As shown in FIG. 14A, the moving member 1112 of the axial motion mechanism 1110 integrally includes: a coupling portion 1112A; a rod portion 1112B; a member disposed portion 1112C; and a balancing member 1138 from the lower part toward the upper part thereof in the Z direction. The balancing member 1138 has mass corresponding to the mass of a particular stylus (a particular type of a stylus) 1106. More specifically, when the particular stylus 1106 is supported by the rotating member 1136 via the moving member 1112, the balancing member 1138 causes the center of gravity of the members supported by the second diaphragm structure 1140 to coincide with the rotation center RC of the rotary motion mechanism 1134. Note that the particular stylus 1106 in the present embodiment refers to a stylus assumed to be most frequently attached to a measuring probe 1100 of the present embodiment.

As shown in FIG. 14A, a reference member 1116 is provided on an upper end of the balancing member 1138 (since a combination of the reference member 1116 and an orientation detector 1122 is similar to that in the seventh embodiment, the description thereof will be omitted). The member disposed portion 1112C is formed below the balancing member 1138 and a reference member 1124 is disposed on a side surface of the member disposed portion 1112C. The rod portion 1112B is formed below the member disposed portion 1112C and disposed between the pair of first diaphragm structures 1114 and 1115. The rod portion 1112B is housed in the rotating member 1136. The coupling portion 1112A is formed below the rod portion 1112B. A flange member 1142 is attached to a lower end of the coupling portion 1112A.

As shown in FIG. 14A, a diameter of an opening 1108A of the main body housing 1108 is set to be smaller than an outer diameter of the flange member 1142. A distance between an upper end 1142C of the flange member 1142 and a lower end 1108AB of the opening 1108A is determined to regulate upward displacement of the flange member 1142 in the Z direction so that an amount of deformation in the pair of first diaphragm structures 1114 and 1115 falls within the range of elastic deformation. In other words, it can be said that the probe main body 1102 includes the main body housing 1108 and the flange member 1142 together serving as a first limiting member for limiting an amount of deformation in the pair of first diaphragm structures 1114 and 1115 within the range of elastic deformation.

As shown in FIG. 14A, the displacement detector 1126 disposed on the supporting part 1136AA faces the reference member 1124 disposed on the member disposed portion 1112C to detect reflected light from the reference member 1124. Incremental patterns having different reflectances for light from a light source (not shown) are provided at predetermined intervals in the axial direction O on a surface of the reference member 1124 closer to the displacement detector 1126. The reference member 1124, the displacement detector 1126, and the light source together constitute a photoelectric incremental linear encoder (which may be a photoelectric absolute linear encoder) that outputs a two-phase sinusoidal signal.

In the present embodiment, the second diaphragm structure 1140 is disposed between the pair of first diaphragm structures 1114 and 1115 in the axial direction O. Thus, despite that the axial motion mechanism 1110 and the rotary motion mechanism 1134 are connected in series in the axial direction O, the length of a suspension mechanism configured by the axial motion mechanism 1110 and the rotary motion mechanism 1134 in the axial direction O can be made shorter than the simple addition of the lengths of the axial motion mechanism 1110 and the rotary motion mechanism 1134 in the axial direction O. Note that the present invention is not limited thereto. A plurality of first diaphragm structures may be provided without constituting such a pair.

In the present embodiment, when the particular stylus 1106 is supported by the rotating member 1136, the center of gravity of the members supported by the second diaphragm structure 1140 coincides with the rotation center RC of the rotary motion mechanism 1134. This can prevent the central axis of the stylus 1106 from tilting from the axial direction even when the measuring probe 1100 is in the horizontal position, for example. More specifically, since a change in orientation, such as the tilting of the measuring probe 1100 itself, has no influence on the rectilinear movement accuracy of the stylus 1106 (moving member 1112), a change in measurement accuracy can be prevented from occurring.

Furthermore, in the present embodiment, the pair of first diaphragm structures 1114 and 1115 are disposed at a symmetric distance with respect to the second diaphragm structure 1140 (i.e., the rotation center RC coincides with a midpoint between the pair of first diaphragm structures 1114 and 1115). This enables the configuration of the balanced suspension mechanism, the prevention of unintended deformation in the suspension mechanism, and improved accuracy of the measuring probe 1100. At the same time, even when the central axis of the stylus 1106 is tilted with respect to the axial direction O, for example, such a tilt has no influence on the rectilinear movement accuracy of the stylus 1106 (moving member 1112). Thus, a change in measurement accuracy can be prevented from occurring. Note that the present invention is not limited thereto. A pair of first diaphragm structures may not be disposed at a symmetric distance with respect to the second diaphragm structure. Alternatively, even-numbered (such as 4, 6, . . . excluding 2) first diaphragm structures may be provided, and those first diaphragm structures may be disposed at symmetric positions with respect to the second diaphragm structure. In the present embodiment, the supporting of the rotating member 1136 (which supports the axial motion mechanism 1110) by the rotary motion mechanism 1134 leads to the direct supporting of the stylus 1106 by the moving member 1112. Thus, when compared with a case where the axial motion mechanism supports the moving member (which supports the rotary motion mechanism), the mass of the members supported by the moving member 1112 can be reduced, thereby facilitating the optimization of the restoring force of the pair of first diaphragm structures 1114 and 1115. Consequently, displacement of the stylus 1106 in the axial direction O by the axial motion mechanism 1110 can be detected with high sensitivity. At the same time, the responsivity of the axial motion mechanism 1110 can be improved. In other words, in the present embodiment, the measuring probe can have a reduced length in the axial direction O and a reduced weight and achieve reduced shape errors and improved measurement accuracy.

FIG. 14B shows the fourteenth embodiment, which is a variation of the thirteenth embodiment. Here, displacement of a moving member 1162 is detected by the differential transformer transducer in the seventh embodiment. Specifically, a reference member 1174 provided in the moving member 1162 is a cylindrical metal member which generates eddy current. A displacement detector 1176 has a cylindrical shape and is disposed so as to be in proximity to and face the reference member 1174. The displacement detector 1176 is configured by: an exciting coil that oscillates at a high frequency; and a set of differential-coupled receiving coils disposed so as to interpose the exciting coil therebetween. A supporting part 1186AA has a cylindrical shape and supports the displacement detector 1176 radially inside thereof. The other elements are similar to those in the thirteenth embodiment and the description thereof will be therefore omitted.

Although the supporting of the rotating member (which supports the axial motion mechanism) by the rotary motion mechanism leads to the direct supporting of the stylus by the moving member in the thirteenth and fourteenth embodiments, the present invention is not limited thereto. For example, the present invention may be configured as in the fifteenth embodiment shown in FIG. 15. The fifteenth embodiment is different from the thirteenth embodiment mainly in supporting relationship between a rotary motion mechanism and an axial motion mechanism and has a configuration similar to that in the third embodiment. Thus, for components excluding those different from the third and thirteenth embodiments, basically the first two digits of their reference numerals are simply changed from the third and thirteenth embodiments and the description thereof will be omitted.

Figure 15:
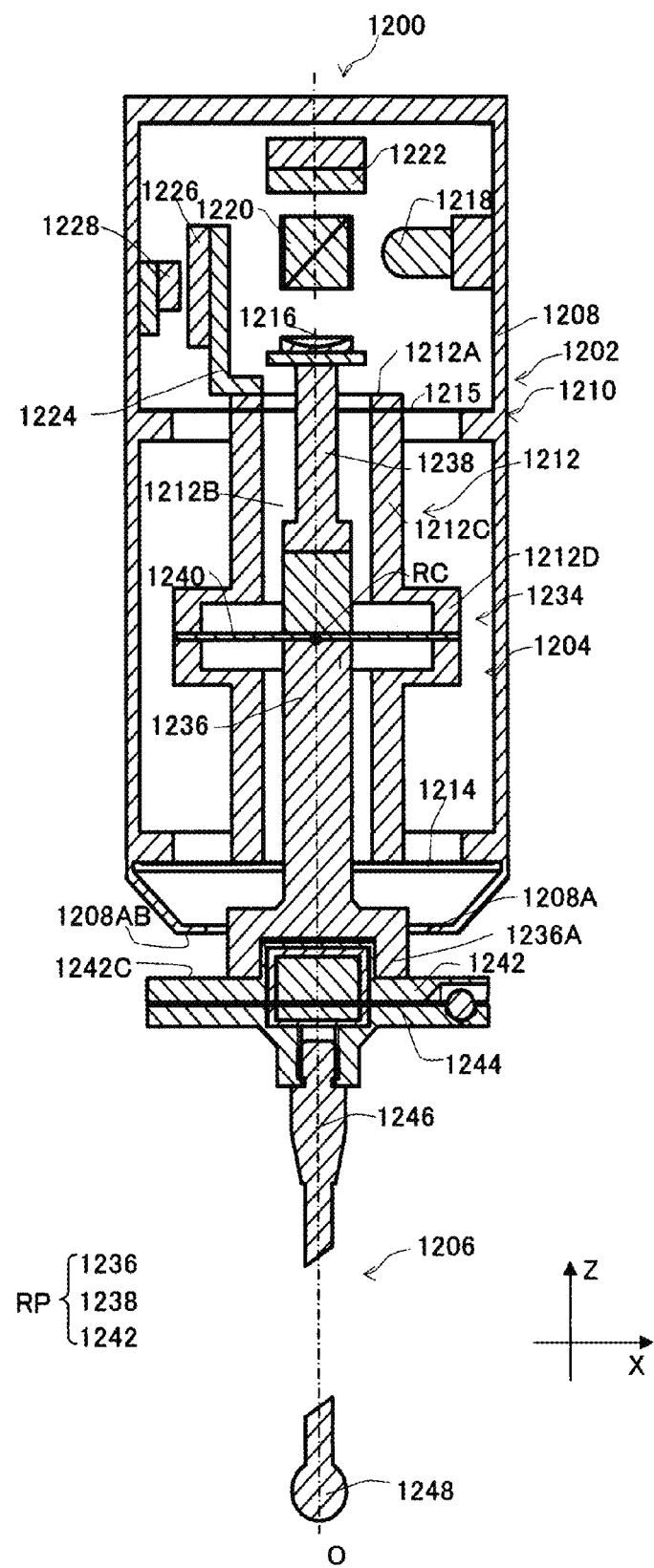
FIG. 15 is a schematic diagram illustrating a cross section of a measuring probe according to a fifteenth embodiment of the present invention.

In the fifteenth embodiment, the supporting of a moving member (rotary element housing member) 1212, which supports a rotary motion mechanism 1234, by an axial motion mechanism 1210 leads to the direct supporting of a stylus 1206 by a rotating member RP as shown in FIG. 15. In other words, a main body housing (axial element housing member) 1208 supports the axial motion mechanism 1210. Thus, a displacement detector 1228 is supported on an inner side surface of the main body housing 1208. The moving member 1212 has a cylindrical shape symmetric with respect to a second diaphragm structure 1240 in the axial direction O.

Specifically, the moving member 1212 integrally includes two cylindrical portions 1212C and two joining portions 1212D as shown in FIG. 15. Central portions of first diaphragm structures 1214 and 1215 are fixed to the vicinities of outer edges of the two cylindrical portions 1212C. An inner diameter of the two joining portions 1212D is set to be greater than an inner diameter of a hollow portion 1212B of the cylindrical portion 1212C. The two joining portions 1212D are coupled to each other with the second diaphragm structure 1240 interposed therebetween. Therefore, also in the present embodiment, the pair of first diaphragm structures 1214 and 1215 are disposed at a symmetric distance with respect to the second diaphragm structure 1240 in the axial direction O. A reference member 1226 is provided on an upper end 1212A of the moving member 1212 via a scale bracket 1224 so as to face the displacement detector 1228.

As shown in FIG. 15, the rotary motion mechanism 1234 is supported radially inside of the moving member 1212. More specifically, the moving member 1212 and the rotary motion mechanism 1234 together constitute a rotary module 1204. The rotating member RP is configured by an upper member 1236, a balancing member 1238, and a flange member 1242. An upper end of the balancing member 1238 protrudes from the upper end 1212A of the moving member 1212 and a reference member 1216 is formed thereon. In other words, in the present embodiment, the reference member 1216 is provided on an end of the rotating member RP opposite to the stylus 1206.

In the present embodiment, the mass of the member supported by the rotating member RP can be reduced and displacement of the stylus 1206 in the XY direction by the rotary motion mechanism 1234 can be detected with high sensitivity when compared with a case where the rotary motion mechanism supports the axial motion mechanism.

As shown in FIG. 15, in the present embodiment, a diameter of an opening 1208A of the main body housing 1208 is set to be smaller than an outer diameter of the flange member 1242. A distance between an upper end 1242C of the flange member 1242 and a lower end 1208AB of the opening 1208A is determined to regulate upward displacement of the flange member 1242 in the Z direction so that an amount of deformation in the pair of first diaphragm structures 1214 and 1215 falls within the range of elastic deformation. In other words, it can be said that a probe main body 1202 includes the main body housing 1208 and the flange member 1242 together serving as a first limiting member for limiting an amount of deformation in the pair of first diaphragm structures 1214 and 1215 within the range of elastic deformation.

Although the displacement detector 1228 constitutes a photoelectric incremental linear encoder in the fifteenth embodiment, the present invention is not limited thereto. For example, the present invention may be configured as in the sixteenth embodiment shown in FIGS. 16A and 16B. The sixteenth embodiment is different from the fifteenth embodiment in a configuration around a displacement detector and employs the interference optical system IF shown in the fourth embodiment. Thus, for components excluding those different from the fourth and fifteenth embodiments, basically the first two digits of their reference numerals are simply changed from the fifteenth embodiment and the description thereof will be omitted.

Figure 16A:
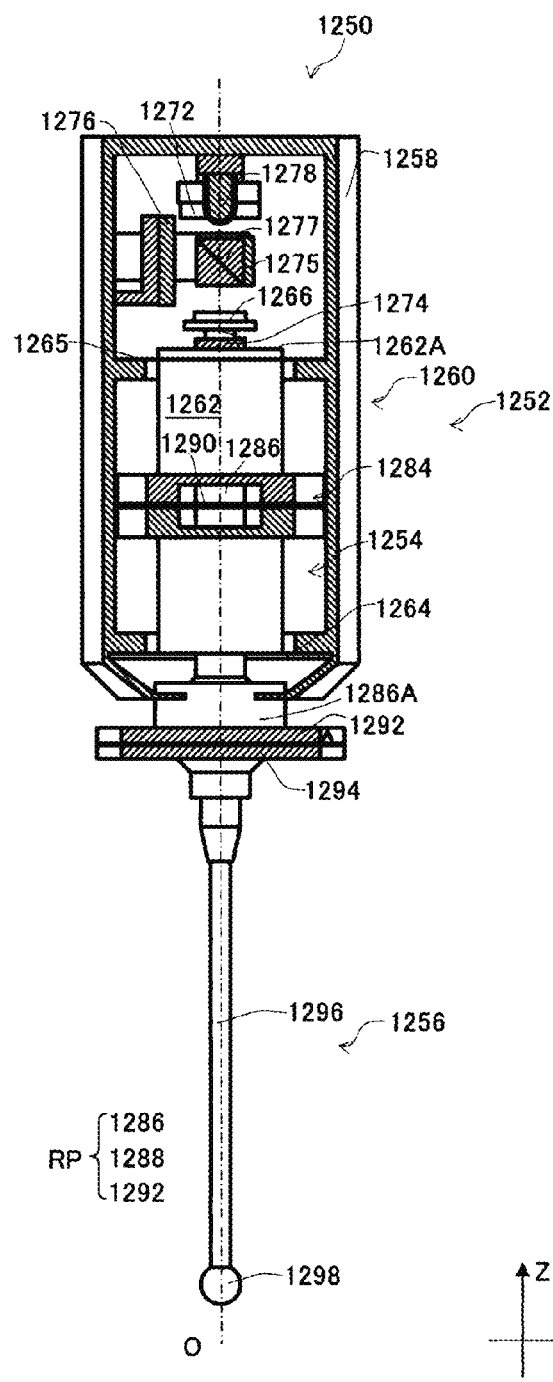
FIG. 16A is a schematic diagram illustrating a cross section of a measuring probe according to a sixteenth embodiment of the present invention taken along line (A)-(A) shifted from a central axis O in FIG. 16B.
Figure 16B:
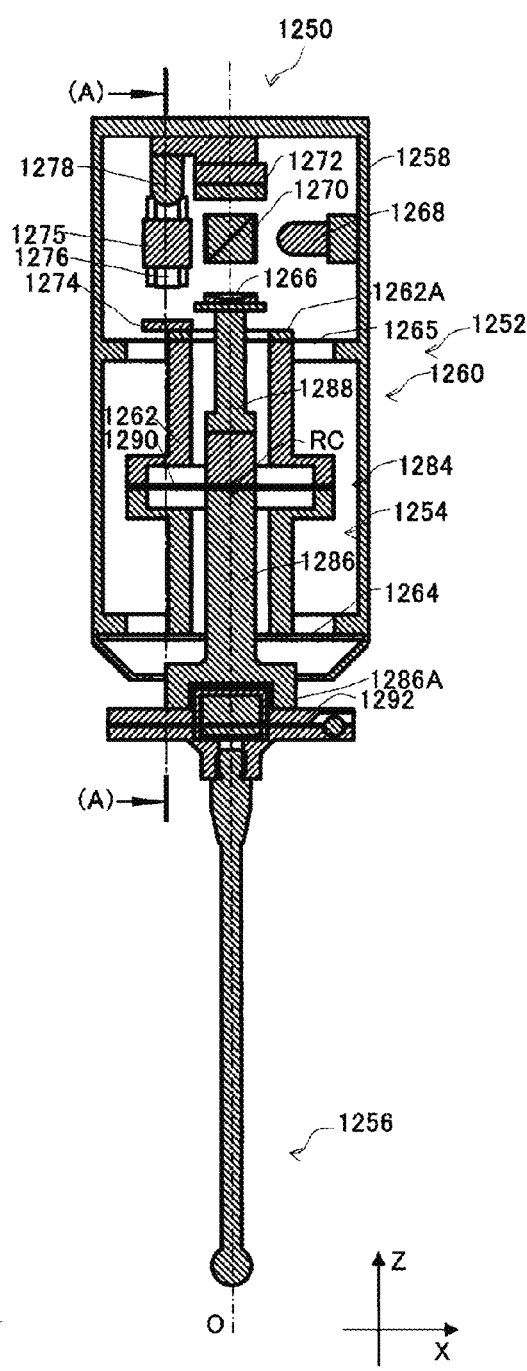
FIG. 16B is a schematic diagram illustrating a cross section of a measuring probe according to the sixteenth embodiment of the present invention taken along the central axis O.

In the sixteenth embodiment, an orientation detector 1272 is disposed on an inner upper surface of a main body housing 1258 on the central axis O as shown in FIGS. 16A and 16B. Thus, a reference member 1274, a reference mirror 1275, a beam splitter 1277, and a light source 1278 together constituting the interference optical system IF and an optical path for a displacement detector 1276 are provided at positions shown in FIG. 16B, which are shifted in the X direction from the central axis O. Such a configuration allows an improvement in measurement accuracy in the XYZ direction as with the fourth embodiment. In the present embodiment, a flange member 1292 is provided with V-grooves, instead of rollers, used for positioning with a stylus 1256.

Unlike the thirteenth embodiment, the present invention may be configured as in the seventeenth embodiment shown in FIG. 17A, for example. The seventeenth embodiment is different from the thirteenth embodiment mainly in the employment of a stylus to which the counterbalance mechanism described in the twelfth embodiment is added. Thus, basically the first two digits of their reference numerals are simply changed from the thirteenth embodiment and the description thereof will be omitted.

Also in the seventeenth embodiment, when a stylus 1306 is replaced for a single probe main body 1302, a balance weight 1331C corresponding to the mass of the changed stylus 1306 is necessarily used. This allows a rotating member (axial element housing member) 1336 to directly receive an increase or decrease in the mass of the stylus 1306. More specifically, fluctuations in the initial position of a moving member 1312 in the Z direction due to different styluses 1306 can be prevented by this configuration. In other words, in the present embodiment, a range of motion for the moving member 1312 can be reduced when compared with the thirteenth embodiment, thus allowing further miniaturization of a linear motion module 1304. At the same time, the detection range can be reduced, thus allowing the detection of an amount of displacement of the moving member 1312 with a higher resolution.

FIG. 17B shows the eighteenth embodiment, which is a variation of the seventeenth embodiment. Here, a balancing member 1388 is supported by a supporting part 1387 such that the position thereof can be adjusted as with the twelfth embodiment. The eighteenth embodiment is different from the seventeenth embodiment mainly in the addition of the balancing member described in the twelfth embodiment. Thus, basically the first two digits of their reference numerals are simply changed from the seventeenth embodiment and the description thereof will be omitted. A displacement detector is supported as in the thirteenth and fourteenth embodiments.

Note that a counterbalance mechanism can be applied also to a measuring probe 1200 shown in the fifteenth embodiment. For example, the present invention may be configured as in the nineteenth embodiment shown in FIG. 18. The nineteenth embodiment is different from the fifteenth embodiment in the addition of a counterbalance mechanism different from that in the seventeenth embodiment. Thus, for components excluding those different from the fifteenth embodiment, basically the first two digits of their reference numerals are simply changed from the fifteenth embodiment and the description thereof will be omitted.

Figure 18:
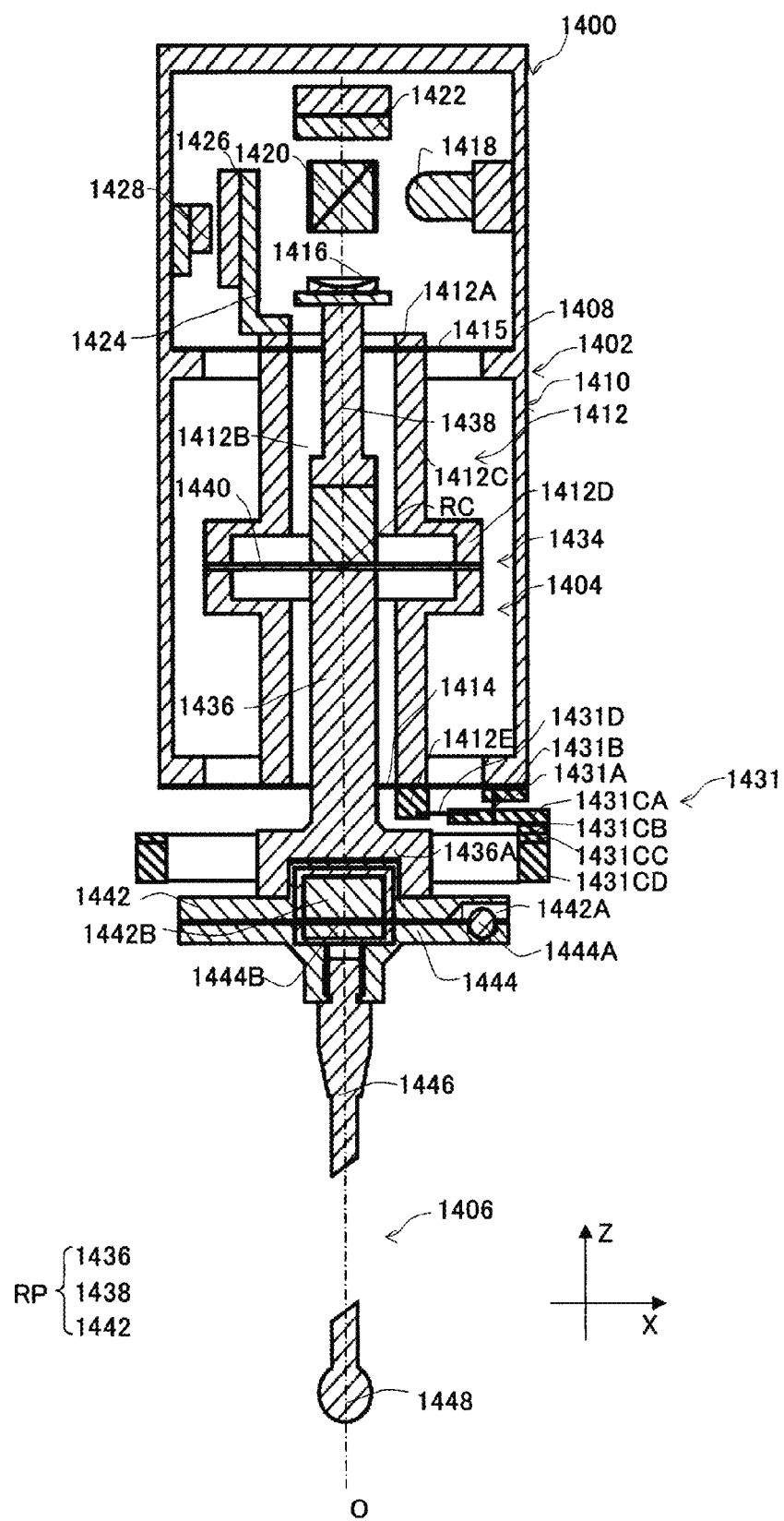
FIG. 18 is a schematic diagram illustrating a cross section of a measuring probe according to a nineteenth embodiment of the present invention.

In the nineteenth embodiment, a probe main body 1402 includes: a balance weight 1431CD corresponding to the mass of a stylus 1406; and counterbalance mechanisms 1431 as shown in FIG. 18. Unlike the twelfth embodiment, the three counterbalance mechanisms 1431 are separated from the stylus 1406, supported by a main body housing (axial element housing member) 1408, and configured to keep the stylus 1406 and the balance weight 1431CD in balance in the Z direction. Specifically, the counterbalance mechanism 1431 includes: a supporting member 1431A; a support shaft 1431B; a coupling portion 1431CA; a permanent magnet 1431CB; and a coupling shaft 1431D. The supporting members 1431A are disposed at intervals of 120 degrees in the circumferential direction on a lower end of the main body housing 1408. The support shaft 1431B is fixed to the supporting member 1431A to support the coupling portion 1431CA. The coupling shaft 1431D is provided in a direction perpendicular to the Z direction at an end of the coupling portion 1431CA closer to the central axis O with respect to the support shaft 1431B. On the other hand, a connecting portion 1412E is provided on a lower end of a moving member 1412. A tip of the coupling shaft 1431D is coupled to the connecting portion 1412E. The permanent magnet 1431CB is disposed at an end of the coupling portion 1431CA opposite to the coupling shaft 1431D with respect to the support shaft 1431B.

As shown in FIG. 18, the balance weight 1431CD has an annular shape (which may be divided corresponding to the number of the counterbalance mechanisms 1431). A magnetic member (which may be a magnet) 1431CC attractable to the permanent magnet 1431CB is provided on an upper surface of the balance weight 1431CD. Note that an inner diameter of the balance weight 1431CD is set to be greater than an outer diameter of a flange member 1442 and a flange part 1444. Thus, the attachment and detachment of the balance weight 1431CD are possible even after the coupling of the stylus 1406.

Thus, when the stylus 1406 is replaced for the single probe main body 1402, the balance weight 1431CD corresponding to the mass of the changed stylus 1406 can be freely attached to the counterbalance mechanism 1431. This allows the main body housing 1408 to directly receive an increase or decrease in the mass of the stylus 1406. More specifically, fluctuations in the initial position of a moving member 1412 in the Z direction due to different styluses 1406 can be prevented by this configuration. In other words, in the present embodiment, a range of motion for the moving member 1412 can be reduced when compared with the fifteenth embodiment, thus allowing further miniaturization of the probe main body 1402. At the same time, the detection range can be reduced, thus allowing the detection of an amount of displacement of the moving member 1412 with a higher resolution.

In the fifteenth embodiment, the distance between the lower end 1208AB of the opening 1208A and the upper end 1242C of the flange member 1242 is determined to regulate displacement of the moving member 1212 so that an amount of deformation in the pair of first diaphragm structures 1214 and 1215 falls within the range of elastic deformation. In other words, it can be said that the probe main body 1202 includes the main body housing 1208 and the flange member 1242 together serving as the first limiting member for limiting an amount of deformation in the pair of first diaphragm structures 1214 and 1215 within the range of elastic deformation. By contrast to this, the present invention may be configured as in the twentieth embodiment shown in FIG. 19A, for example. The twentieth embodiment is different from the fifteenth embodiment mainly in relationship between a main body housing and a moving member and relationship between a rotating member and the moving member. Thus, for components excluding those associated with the relationship between the main body housing and the moving member and the relationship between the rotating member and the moving member, basically the first two digits of their reference numerals are simply changed from the fifteenth embodiment and the description thereof will be omitted.

In the twentieth embodiment, a ring portion 1462C is provided at a lower end of a moving member (rotary element housing member) 1462 so as to face an upper end of a coupling portion 1486A of a rotating member RP as shown in FIG. 19A. In other words, it can be said that the ring portion 1462C is a second wall member disposed integrally with the moving member 1462. At least part of a gap between (a lower end of) the ring portion 1462C and (an upper end of) the coupling portion 1486A is filled with a second viscous material SV, such as a grease oil. Consequently, at least the second viscous material SV can damp the displacement of the rotating member RP with respect to the ring portion 1462C, reduce vibration in the XY direction caused by the movement of a measuring probe 1450, for example, and prevent an increase in noise associated with an increase in the sensitivity of the measuring probe 1450.

Also, an inner wall portion 1458B is provided in a main body housing (axial element housing member) 1458 so as to face an outer side surface of the moving member 1462 as shown in FIG. 19A. In other words, it can be said that the inner wall portion 1458B is a first wall member disposed so as to face the moving member 1462 and to be integral with the main body housing 1458. At least part of a gap between (an inner side surface of) the inner wall portion 1458B and (an outer side surface of) the moving member 1462 is filled with a first viscous material FV, such as a grease oil. Consequently, at least the first viscous material FV can damp the displacement of the moving member 1462 with respect to the inner wall portion 1458B, reduce vibration in the Z direction caused by the movement of the measuring probe 1450, for example, and prevent an increase in noise associated with an increase in the sensitivity of the measuring probe 1450.

Furthermore, in the present embodiment, damping structures in the Z direction and the XY direction are separately provided also. Thus, the first viscous material FV and the second viscous material SV can be individually changed. The damping characteristics in the Z direction and the XY direction can be therefore individually optimized, thus allowing a further increase in the sensitivity of the measuring probe 1450.

As shown in FIG. 19A, the main body housing 1458 is provided with a depressed portion 1458C that houses a flange member 1492 and restricts excessive displacement of the flange member 1492. Also, the inner wall portion 1458B is provided in the vicinity of a joining portion 1462D of the moving member 1462 in the Z direction. Thus, a distance between an upper end 1458BA of the inner wall portion 1458B and a lower end 1462DA of the joining portion 1462D of the moving member 1462 and a distance between an upper end 1458CA of the depressed portion 1458C and an upper end 1492B of the flange member 1492 are determined to regulate displacement of the moving member 1462 so that an amount of deformation in a pair of first diaphragm structures 1464 and 1465 falls within the range of elastic deformation. In other words, it can be said that a probe main body 1452 includes the main body housing 1458, the moving member 1462, and the flange member 1492 together serving as a first limiting member for limiting an amount of deformation in the pair of first diaphragm structures 1464 and 1465 within the range of elastic deformation.

Moreover, a distance between a side surface 1458CB of the depressed portion 1458C and a side surface 1492A of the flange member 1492 is determined to regulate displacement of the rotating member RP so that an amount of deformation in a second diaphragm structure 1490 falls within the range of elastic deformation as shown in FIG. 19A. In other words, it can be said that the probe main body 1452 includes the main body housing 1458 and the flange member 1492 together serving as a second limiting member for limiting an amount of deformation in the second diaphragm structure 1490 within the range of elastic deformation.

FIG. 19B shows the twenty-first embodiment, which is a variation of the twentieth embodiment, regarding the first viscous material FV and the second viscous material SV. Here, a rotary motion mechanism supports a rotating member which serves as an axial element housing member and a moving member directly supports a stylus as with the thirteenth embodiment, etc. The twenty-first embodiment is different from the thirteenth embodiment, etc., mainly in configurations for retaining the first viscous material FV and the second viscous material SV. Thus, for components excluding those associated with the first viscous material FV and the second viscous material SV, basically the first two digits of their reference numerals are simply changed from the thirteenth embodiment and the description thereof will be omitted. Note that a displacement detector is supported as in the thirteenth embodiment, etc. As shown in FIG. 19B, a stylus 1506 is directly fixed to a moving member 1512 with a flange part 1544 without employing a kinematic joint.

In the twenty-first embodiment, an inner side surface of a cylindrical portion 1536C of a rotating member (axial element housing member) 1536 is disposed so as to face an outer side surface of the moving member 1512 as shown in FIG. 19B. In other words, it can be said that the rotating member 1536 is a first wall member disposed so as to face the moving member 1512. Then a gap between (the inner side surface of) the cylindrical portion 1536C and (the outer side surface of) the moving member 1512 is filled with the first viscous material FV, such as a grease oil. Consequently, at least the first viscous material FV can damp the displacement of the moving member 1512 with respect to the rotating member 1536, reduce vibration in the Z direction caused by the movement of a measuring probe 1500, for example, and prevent an increase in noise associated with an increase in the sensitivity of the measuring probe 1500.

Also, a viscous material receiver 1531 is provided so as to cover a second diaphragm structure 1540 from the both sides thereof as shown in FIG. 19B. The viscous material receiver 1531 is fixed to a main body housing (rotary element housing member) 1508 with its members, each integrally formed by an opposed portion 1531A and an expanded portion 1531B, facing each other. The opposed portion 1531A is a portion facing the second diaphragm structure 1540. The expanded portion 1531B is a portion covering a joining portion 1536D of the moving member 1512 in a contactless manner and provided with an opening 1531C through which the cylindrical portion 1536C can pass. In other words, it can be said that the viscous material receiver 1531 is a second wall member disposed to be integral with the main body housing 1508. A gap between (an inner side surface of) the viscous material receiver 1531 and the second diaphragm structure 1540 is filled with the second viscous material SV, such as a grease oil. Consequently, at least the second viscous material SV can damp the displacement of the second diaphragm structure 1540 with respect to the viscous material receiver 1531, reduce vibration in the XY direction caused by the movement of the measuring probe 1500, for example, and prevent an increase in noise associated with an increase in the sensitivity of the measuring probe 1500.

Furthermore, in the present embodiment, damping structures in the Z direction and the XY direction are separately provided also. Thus, the first viscous material FV and the second viscous material SV can be individually changed. The damping characteristics in the Z direction and the XY direction can be therefore individually optimized, thus allowing a further increase in the sensitivity of the measuring probe 1500.

Although the orientation detector is incorporated in the probe main body in the thirteenth to twenty-first embodiments, the present invention is not limited thereto. For example, the present invention may be configured as in the twenty-second embodiment shown in FIG. 20. In the twenty-second embodiment, the probe main body in the thirteenth and fourteenth embodiments is separable between a beam splitter and a reference member in the axial direction O. In other words, the twenty-second embodiment is different from the thirteenth and fourteenth embodiments mainly in the position of an orientation detector, and a preceding module in the separated configuration is approximately the same as that in the tenth embodiment. Thus, basically the first two digits of their reference numerals are simply changed from the thirteenth and fourteenth embodiments, respectively, and the description thereof will be omitted.

Figure 20:
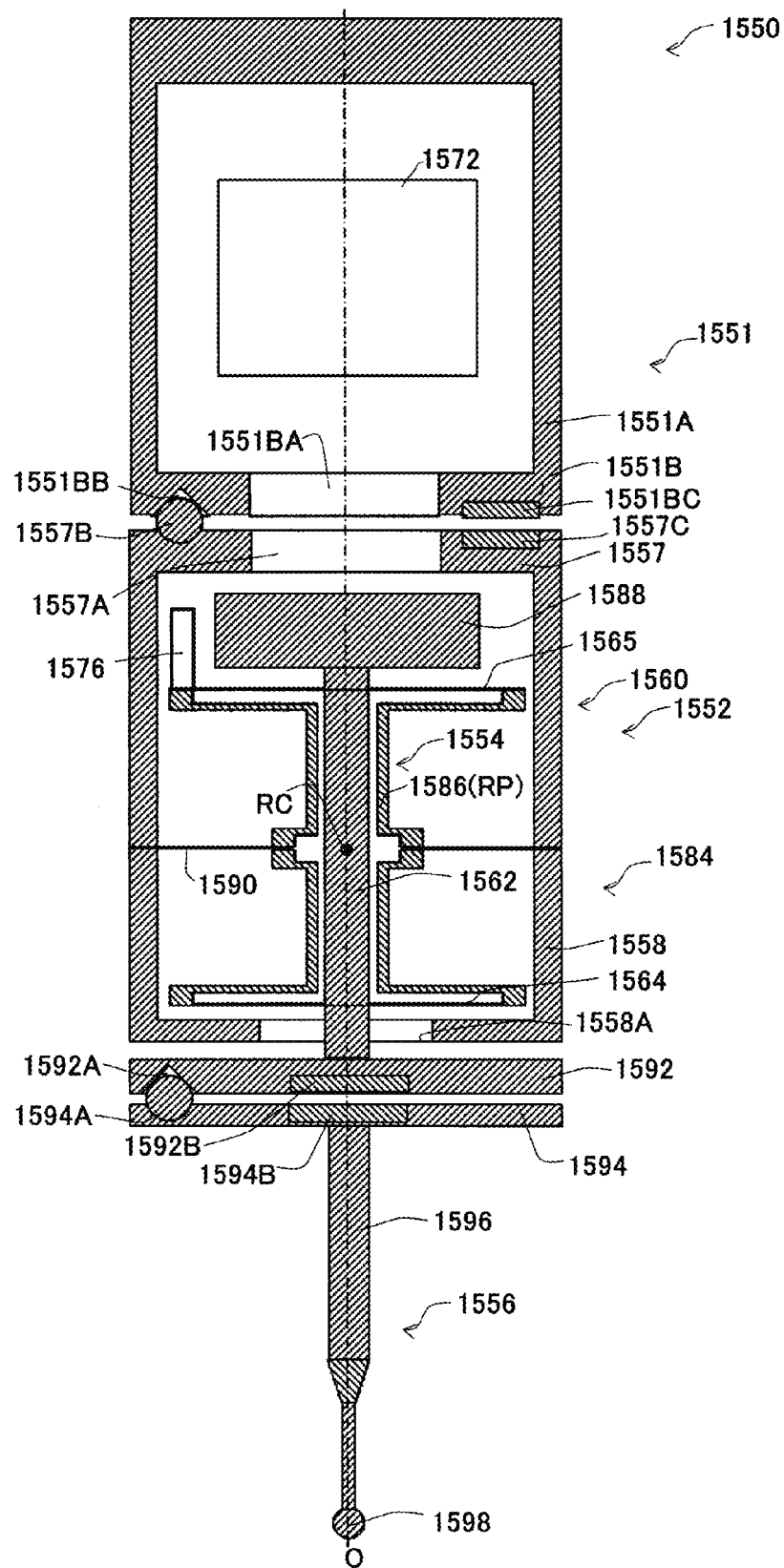
FIG. 20 is a schematic diagram illustrating a cross section of a measuring probe according to a twenty-second embodiment of the present invention.

In the twenty-second embodiment, an axial motion mechanism 1560, a rotary motion mechanism 1584, and a displacement detector 1576 are incorporated in a probe main body 1552, and an orientation detector 1572, etc., are incorporated in a preceding module 1551 as shown in FIG. 20. Thus, the probe main body 1552 can be easily changed and the preceding module 1551 can also be easily changed. More specifically, change in performance or replacement of the set of the axial motion mechanism 1560, the rotary motion mechanism 1584, and the displacement detector 1576 and that of the orientation detector 1572 can be independently performed and the cost thereof can be reduced. Moreover, since the orientation detector 1572 can be separated from the probe main body 1552, the size and cost of the probe main body 1552 can be reduced. Although a moving member 1562 directly supports a stylus 1556 in the present embodiment, the preceding module may be provided in the case that the rotating member RP directly supports the stylus as in the twentieth embodiment.

Although the center of gravity of the members supported by the second diaphragm structure, including the stylus, basically coincides with the rotation center RC in the thirteenth to twenty-second embodiments, the present invention is not limited thereto. For example, the center of gravity of the members supported by the second diaphragm structure, including the stylus, may be set on purpose on a side closer to the stylus with respect to the rotation center RC. In this case, the mass and volume of the members supported by the second diaphragm structure on a side opposite to the stylus with respect to the rotation center RC can be minimized. This allows a measuring probe to have an increased natural frequency and a measuring probe having sensitivity to a frequency higher than that in the measuring probes of the thirteenth to twenty-second embodiments (e.g., capable of a fast response) can be thus achieved.

Although the measuring probe is used as a scanning probe in the above embodiments, the present invention is not limited thereto. For example, the measuring probe may be used as a touch probe.

The present invention can be widely applied to measuring probes used for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by a rotary motion, the measuring probe comprising:
   an axial element housing member that supports the axial motion mechanism,
   a rotary element housing member that supports the rotary motion mechanism, and
   a displacement detector supported by and within the axial element housing member, for detecting displacement of the moving member, wherein
   in the measuring probe:
      the axial motion mechanism supports the rotary element housing member and the rotating member supports the stylus, or the rotary motion mechanism supports the axial element housing member and the moving member supports the stylus,
      the axial element housing member encloses an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes,
      the displacement detector can detect a phase shift in the plurality of interference fringes generated of the interference optical system, and
      when coming into contact with a surface of the object to be measured, the contact part is configured to freely change its position in three dimensions along a shape of the surface via the axial motion mechanism and the rotary motion mechanism.

2. The measuring probe according to claim 1, wherein the displacement detector outputs a relative position detection signal that allows detection of a relative position of the moving member.

3. The measuring probe according to claim 1, wherein the displacement detector outputs an absolute position detection signal that allows detection of an absolute position of the moving member.

4. The measuring probe according to claim 1, wherein the rotating member that allows the contact part to move along a plane perpendicular to the axial direction by a rotary motion with respect to a rotation center.

5. The measuring probe according to claim 1, wherein
   the rotating member includes a balancing member on a side opposite to the stylus with respect to a rotation center of the rotary motion mechanism, and
   a distance between the rotation center and the balancing member is adjustable.

6. The measuring probe according to claim 1, comprising a balance weight corresponding to mass of the stylus, and
   a counterbalance mechanism supported by the axial element housing member, for keeping the stylus and the balance weight in balance.

7. The measuring probe according to claim 1, wherein
   the axial motion mechanism includes a plurality of first diaphragm structures that allow the moving member to be displaced, and
   an orientation detector is disposed between the rotary motion mechanism and the plurality of first diaphragm structures when the rotary motion mechanism is supported by the axial motion mechanism.

8. The measuring probe according to claim 1, wherein
   an orientation detector detects displacement of reflected light, reflected from a reflecting mirror.

9. The measuring probe according to claim 8, wherein an optical axis is provided so as to pass through the rotation center of the rotary motion mechanism.

10. The measuring probe according to claim 1, wherein
    the axial motion mechanism includes a plurality of first diaphragm structures that allow the moving member to be displaced, and
    the measuring probe comprises a first limiting member for limiting an amount of deformation in the plurality of first diaphragm structures within a range of elastic deformation.

11. The measuring probe according to claim 1, wherein the rotary motion mechanism includes
    a second diaphragm structure that allows the rotating member to be displaced, and
    the measuring probe comprises a second limiting member for limiting an amount of deformation in the second diaphragm structure within a range of elastic deformation.

12. The measuring probe according to claim 1, wherein at least part of a gap between a first wall member, which is disposed so as to face the moving member and to be integral with the axial element housing member, and the moving member, is filled with a first viscous material.

13. The measuring probe according to claim 1, wherein
    the rotary motion mechanism includes a second diaphragm structure that allows the rotating member to be displaced, and
    at least part of a gap between a second wall member, which is disposed to be integral with the rotary element housing member, and any one of the second diaphragm structure and the rotating member, is filled with a second viscous material.

* * * * *

UNITED STATES PATENT AND TRADEMARK OFFICE
CERTIFICATE OF CORRECTION

PATENT NO.        : 9,810,529 B2
APPLICATION NO.   : 14/789266
DATED             : November 7, 2017
INVENTOR(S)       : Atsushi Shimaoka et al.

Page 1 of 1

It is certified that error appears in the above-identified patent and that said Letters Patent is hereby corrected as shown below:

On the Title Page

At Item (73) Assignee, "MITOTOYO CORPORATION" should read -- MITUTOYO CORPORATION --.

Signed and Sealed this
Thirteenth Day of February, 2018

Andrei Iancu
*Director of the United States Patent and Trademark Office*